(12) United States Patent
Kato et al.

(10) Patent No.: US 8,873,881 B2
(45) Date of Patent: Oct. 28, 2014

(54) DUST DETECTION SYSTEM AND DIGITAL CAMERA

(75) Inventors: Tetsuaki Kato, Saitama (JP); Naoto Kawanami, Saitama (JP); Satoru Horita, Tochigi (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 1358 days.

(21) Appl. No.: 12/356,609

(22) Filed: Jan. 21, 2009

(65) Prior Publication Data

US 2009/0185716 A1 Jul. 23, 2009

(30) Foreign Application Priority Data

Jan. 23, 2008 (JP) .................................. 2008-012532

(51) Int. Cl.
| | |
|---|---|
| *G06K 9/40* | (2006.01) |
| *G06K 9/20* | (2006.01) |
| *G06K 9/32* | (2006.01) |
| *G06K 9/36* | (2006.01) |
| *H04N 9/64* | (2006.01) |
| *H04N 5/232* | (2006.01) |
| *G03B 13/00* | (2006.01) |
| *G06T 5/00* | (2006.01) |
| *H04N 5/217* | (2011.01) |
| *H04N 5/367* | (2011.01) |
| *G06T 7/00* | (2006.01) |

(52) U.S. Cl.
CPC ...... *H04N 5/367* (2013.01); *G06T 2207/10004* (2013.01); *H04N 5/2171* (2013.01); *H04N 5/217* (2013.01); *G06T 7/0018* (2013.01)
USPC ........... 382/275; 382/254; 382/283; 382/298; 348/247; 348/355; 358/3.26

(58) Field of Classification Search
USPC ......... 382/100, 141, 152, 181, 190, 195, 254, 382/274–276, 282; 348/241, 246–247, 335; 358/1.1, 1.9, 3.26
See application file for complete search history.

(56) References Cited

U.S. PATENT DOCUMENTS 6,233,364 B1 * 5/2001 Krainiouk et al. ............ 382/275
6,940,550 B2 * 9/2005 Kitawaki et al. .............. 382/275
(Continued)

FOREIGN PATENT DOCUMENTS

| CN | 101001318 | 7/2007 |
|---|---|---|
| JP | 2005-341381 | 12/2005 |

(Continued)

OTHER PUBLICATIONS

English language Abstract of JP 2005-341381, Dec. 8, 2005.
(Continued)

*Primary Examiner* — Randolph I Chu
*Assistant Examiner* — Nathan Bloom
(74) *Attorney, Agent, or Firm* — Greenblum & Bernstein, P.L.C.

(57) ABSTRACT

A dust detection system, comprising a receiver, a dust extraction block, a memory and an image correction block, is provided. The receiver receives an image signal. The dust extraction block generates a dust image signal on the basis of the image signal. The memory stores an intrinsic-flaw image signal corresponding to an intrinsic-flaw image including sub-images of dust that the dust extraction block extracts in initializing. The image correction block generates a corrected dust-image signal on the basis of the intrinsic-flaw image signal and a normal dust-image signal. The normal dust-image signal corresponds to a normal dust image including sub-image of dust that the dust extraction block extracts after initializing. The corrected dust image is the normal dust image that sub-images of dust in the intrinsic-flaw image are deleted from.

20 Claims, 20 Drawing Sheets

(56) References Cited

U.S. PATENT DOCUMENTS

| | | |
|---|---|---|
| 7,853,097 B2 * | 12/2010 | Ishiga ........................... 382/275 |
| 2005/0068452 A1 * | 3/2005 | Steinberg et al. ............. 348/335 |
| 2006/0115177 A1 * | 6/2006 | Ishiga ........................... 382/275 |
| 2007/0030378 A1 * | 2/2007 | Aoyama ....................... 348/340 |
| 2007/0035643 A1 * | 2/2007 | Hashimoto et al. ........... 348/246 |
| 2007/0122056 A1 * | 5/2007 | Steinberg et al. ............. 382/275 |
| 2007/0159539 A1 * | 7/2007 | Kotani .......................... 348/241 |
| 2007/0159551 A1 | 7/2007 | Kotani |
| 2008/0084492 A1 | 4/2008 | Uenaka et al. |
| 2008/0084505 A1 | 4/2008 | Uenaka |
| 2008/0084608 A1 | 4/2008 | Uenaka |

FOREIGN PATENT DOCUMENTS

| | | |
|---|---|---|
| JP | 2007-124006 | 5/2007 |
| JP | 2007-215151 | 8/2007 |

OTHER PUBLICATIONS

Japan Office Action in JP 2008-012532, dated Nov. 15, 2011, along with an English language translation thereof.

China Office Action in CN 101494743, dated Apr. 6, 2012, along with an English language translation thereof.

* cited by examiner

FIG.5
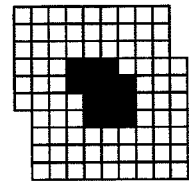
3-PIXEL-ENLARGED SUB-IMAGE OF DUST
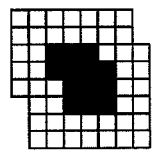
2-PIXEL-ENLARGED SUB-IMAGE OF DUST
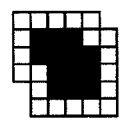
1-PIXEL-ENLARGED SUB-IMAGE OF DUST
SUB-IMAGE OF DUST WITHOUT ENLARGEMENT

FIG.9 CORRECTED DUST IMAGE

DUST DETECTION SYSTEM AND DIGITAL CAMERA

BACKGROUND OF THE INVENTION

1. Field of the Invention

The present invention relates to a dust detection system that detects dust adhering to an imaging device mounted in a photographing apparatus such as a digital camera, based on a photographed image.

2. Description of the Related Art

In a digital camera allowing the interchange of lenses, such as a single-lens reflex camera, dust may accidentally come into the camera body when a lens is removed from the body. Dust entering the body may adhere to the imaging device or a filter on the imaging device. When such dust adheres, it may appear in a photographed image.

Even if dust is visible in a photographed image, some of the dust may be invisible on direct visual inspection. Japanese Unexamined Patent Publication No. 2005-341381 proposes a digital camera which determines whether such dust is attached. The user is encouraged to remove the dust through a warning if dust is detected.

In the manufacturing process of an imaging device or during the mounting an imaging device in a camera body, minute flaws may be generated on the infrared cut filter or the low-pass filter, or minute dust may come between such filters. It is difficult to remove such minute flaws and dust after manufacturing. Accordingly, if a flaw or dust is visible in a photographed image on quality check of a camera after manufacturing, the camera fails inspection.

Sufficiently minute flaws and dust are invisible in a photographed image and are not problematic. However, images of such flaws and dust are exaggerated by the edge-enhancement signal processing in the dust-detecting function in the above patent publication, allowing the user to recognize the flaw or dust. Because such flaws and dust cannot be removed, as mentioned above, it is undesirable for the user to detect them even after cleaning the filter or imaging device.

SUMMARY OF THE INVENTION

Therefore, an object of the present invention is to provide a dust detection system that detects dust other than the dust and flaws incidental to manufacturing (the intrinsic flaws) based on a photographed image.

According to the present invention, a dust detection system, comprising a receiver, a dust extraction block, a memory, and an image correction block, is provided. The receiver receives an image signal. An imaging device generates the image signal according to a captured optical image. The dust extraction block generates a dust-image signal by extracting sub-images of dust in the optical image on the basis of the image signal. The memory stores an intrinsic-flaw image signal corresponding to an intrinsic-flaw image including sub-images of dust that the dust extraction block extracts in initializing. The image correction block generates a corrected dust-image signal on the basis of the intrinsic-flaw image signal and a normal dust-image signal. The corrected dust image signal corresponds to a corrected dust image. The normal dust-image signal corresponds to a normal dust image including sub-image of dust that the dust extraction block extracts after the initializing. The corrected dust image is the normal dust image that sub-images of dust in the intrinsic-flaw image are deleted from.

Further, an intrinsic-flaw area is determined on the basis of a detected-flaw area. The detected-flaw area is an area where dust is detected in the intrinsic-flaw image. The image correction block generates the corrected dust-image signal by deleting sub-images of dust in the intrinsic-flaw area of the normal dust image.

Further, the dust detection system comprises a first determination block. The first determination block determines the value of adjustable parameter. The adjustable parameter affects the visibility of a sub-image of a subject in an entire image captured by the imaging device. The subject is located in the peripheral area of the surface of the imaging device. The adjustable parameter is determined so that the visibility upon capturing the normal dust image is reduced more than when the intrinsic-flaw image is captured.

BRIEF DESCRIPTION OF THE DRAWINGS

The objects and advantages of the present invention will be better understood from the following description, with reference to the accompanying drawings in which:

FIG. 5 illustrates the enlargement of the detected-flaw area;

DESCRIPTION OF THE PREFERRED EMBODIMENTS

Figure 1:
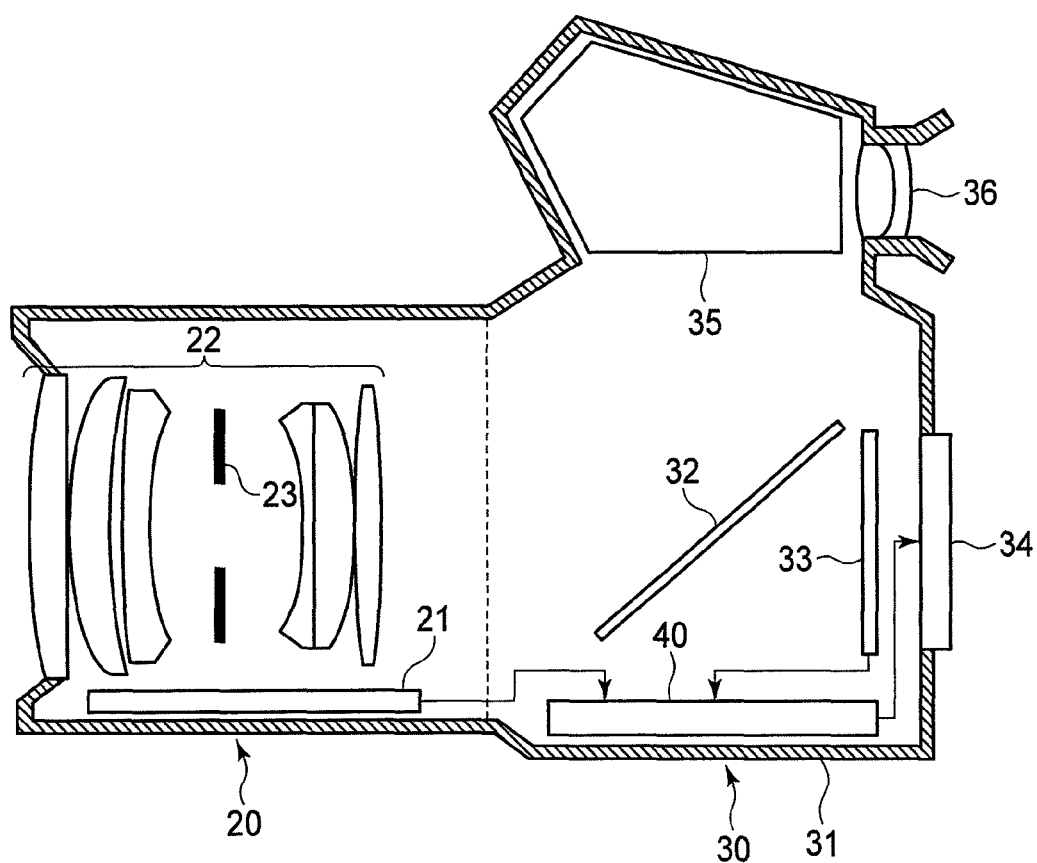
FIG. 1 is a section diagram showing the partial internal structure of a digital camera having the dust detection system of the first to third embodiments of the present invention.

The present invention is described below with reference to the embodiment shown in the drawings.

In FIG. 1, the digital camera 10 is a single-lens reflex camera, and comprises a lens unit 20 and camera block 30. The lens unit 20 can be connected to and disconnected from the camera block 30. In FIG. 1, the horizontal and vertical directions correspond to the front to back and vertical direction of the digital camera 10, respectively. In the description below, a portion of a complete image is defined as a subimage.

The lens unit 20 comprises a lens-unit driving mechanism 21 (first determination block) and a photographic optical system 22. In addition, lens memory (not depicted) is mounted in the lens unit 20. The lens memory stores information of photographic optical system 22, such as maximum aperture value, minimum aperture value, focal length, least circle of confusion, location of exit pupil, and so on.

The camera block 30 is formed by mounting a mirror 32, an imaging device 33, a monitor 34, an image-processing block 40, a pentaprism 35, an eyepiece 36, and other components in a body 31. The lens unit periodically communicates with the camera block 30, whereupon the information of the photographic optical system 22 is stored in a flash memory (not depicted in FIG. 1) mounted in the camera block 30. The information of the photographic optical system 22 is used when certain functions such as diaphragm control, are carried out. In a camera having a united form of the lens unit 20 and the camera block 30, information on the photographic optical system 22 is directly stored in the flash memory in the camera block 30.

The photographic optical system 22 comprises a plurality of lenses, including a focus lens and a zoom lens, and diaphragm 23. By moving the focus lens along the optical axis of the photographic optical system 22, focus is adjusted. By moving the zoom lens along the optical axis, focal length is adjusted. In addition, by adjusting the size of the aperture of diaphragm 23, the amount of incident light may be adjusted. The lens-unit driving mechanism 21 moves the focus lens and the zoom lens and adjusts the size of the aperture of the diaphragm 23.

The mirror 32 is mounted so that the mirror 32 rotates around an axis perpendicular to the optical axis of the photographic optical system 22. In ready mode for photographing, the mirror 32 is kept in the optical axis so that the angle between the optical axis and the plane surface of the mirror 32 is 45 degrees.

The pentaprism 35 is mounted over the mirror 32. The imaging device 33 is mounted in the rear of the mirror 32. The eyepiece 36 is mounted in the rear of the pentaprism 35.

In ready mode for photographing, light reflected from a subject passes through the photographic optical system 22, and is reflected by the mirror 32. The reflected optical image is emitted from the eyepiece 36 via the pentaprism 35. The optical image can be observed at the eyepiece 36.

By depressing the release button (not depicted), a release operation is carried out. In the release operation, the mirror 32 is turned upward and the shutter (not depicted) is opened, and an optical image of the subject is formed on a light-receiving surface of the imaging device 33.

The imaging device 33 is covered with an infrared cut filter (not depicted) and an optical low-pass filter (not depicted). Sealing members (not depicted) are mounted between the imaging device and the infrared cut filter and between the infrared cut filter and the optical low-pass filter to prevent dust from coming into the space between them.

The imaging device 33 generates an image signal based on the entire optical image reaching the light-receiving surface. The image signal is transmitted to the image-processing block 40, and undergoes predetermined data processing. The image-processing block 40 is connected to the monitor 34. An image corresponding to the image signal transmitted from the image-processing block 40 is displayed on the monitor 34.

Figure 2:
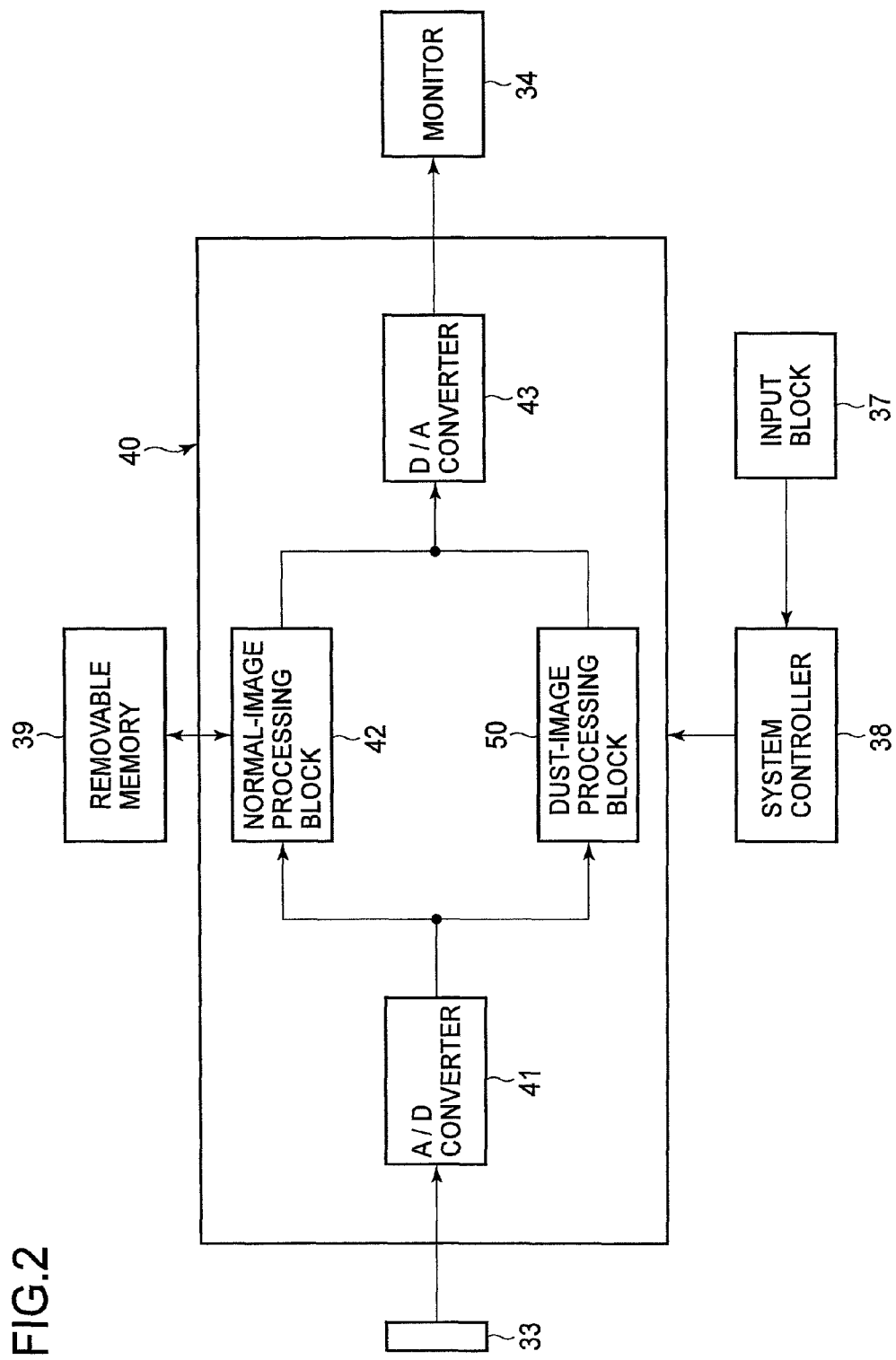
FIG. 2 is a block diagram showing the internal structure of the image-processing block of the first and second embodiments.

Next, the structure of the image-processing block 40 is explained. As shown in FIG. 2, the image-processing block 40 comprises an A/D converter 41 (receiver), a normal-image processing block 42, a dust-image processing block 50, a D/A converter 43, and other components.

The digital camera 10 has a plurality of operation modes including a photographing mode, a displaying mode, and a dust-alert mode. The operation mode is changed according to the user's command input to input block 37 (switch). On the basis of the command input to the input block 37, a system controller 38 (controller) controls each component including the image-processing block 40 of the digital camera 10.

When the operation mode of the digital camera 10 is changed to the photographing mode, all components of the digital camera 10 are switched into ready mode for photographing. When the release button is depressed under ready mode for photographing, the mirror 32 and the shutter is driven as described above, and the imaging device 33 is driven so that one frame of an image signal is generated.

The generated image signal is transmitted to the image-processing block 40, as described above. The analog image signal transmitted to the image-processing block 40 is received and digitized by the A/D converter 41. The resulting image data is transmitted to the normal-image processing block 42 under the control of the system controller 38.

The normal-image processing block 42 carries out predetermined data processing, such as white-balance processing and gamma-correction, on the image data. The image data having undergone predetermined data processing is stored in a removable memory 39.

When the operation mode of the digital camera 10 is changed to the display mode, the image data stored in the removable memory 39 is transmitted to the D/A converter 43 via the normal-image processing block 42. The D/A converter 43 converts the digital image data into an image signal, and transmits to the monitor 34. An image corresponding to the received image signal is displayed on the monitor 34, as described above.

In the dust-alert mode, dust adhering to the surface of the imaging device 33 is photographed and displayed on the monitor 34, as explained below.

When the operation mode of the digital camera 10 is changed to the dust-alert mode, the lens unit 20 is adjusted so that photographed objects will be distinguishable in an image. For example, automatic exposure control is carried out according to the aperture-priority mode. The size of the aperture of the diaphragm 23 is adjusted so that the F-number of the photographic optical system 22 is F16, (which is equivalent to the aperture value of 8 in the APEX system). In addition, the shutter speed is adjusted so that the exposure is correct.

After adjusting the aperture size, the release operation is carried out, and an image signal is generated. In the dust-alert mode, uniform field should be photographed in order to detect dust adhering to the imaging device 33. The user is instructed to aim at a pattern-less surface to be photographed for the dust-alert mode, and all the operations following the release operation in the dust-alert mode are carried out on the assumption that the photographed subject has no pattern.

The image signal generated by the imaging device 33 in the dust-alert mode, hereinafter referred to as a normal dust-image signal, is transmitted to the image processing block 40, as in the photographing mode. The transmitted normal dust-image signal is digitized by the A/D converter 41. In the dust-alert mode, the normal dust-image data is transmitted to the dust-image processing block 50 under the control of the system controller 38.

The dust-image processing block 50 generates a corrected dust-image data by carrying out predetermined data processing on the normal dust-image data. As described later, the corrected dust-image data corresponds to an entire corrected dust-image including only sub-images of removable dust that is adhering to the imaging device 33. The corrected dust-image data is transmitted to the D/A converter 43. The D/A converter 43 converts the corrected dust-image data into an analog signal, then the corrected dust-image signal is transmitted to the monitor 34. The correct dust image is displayed on the monitor 34.

Figure 3:
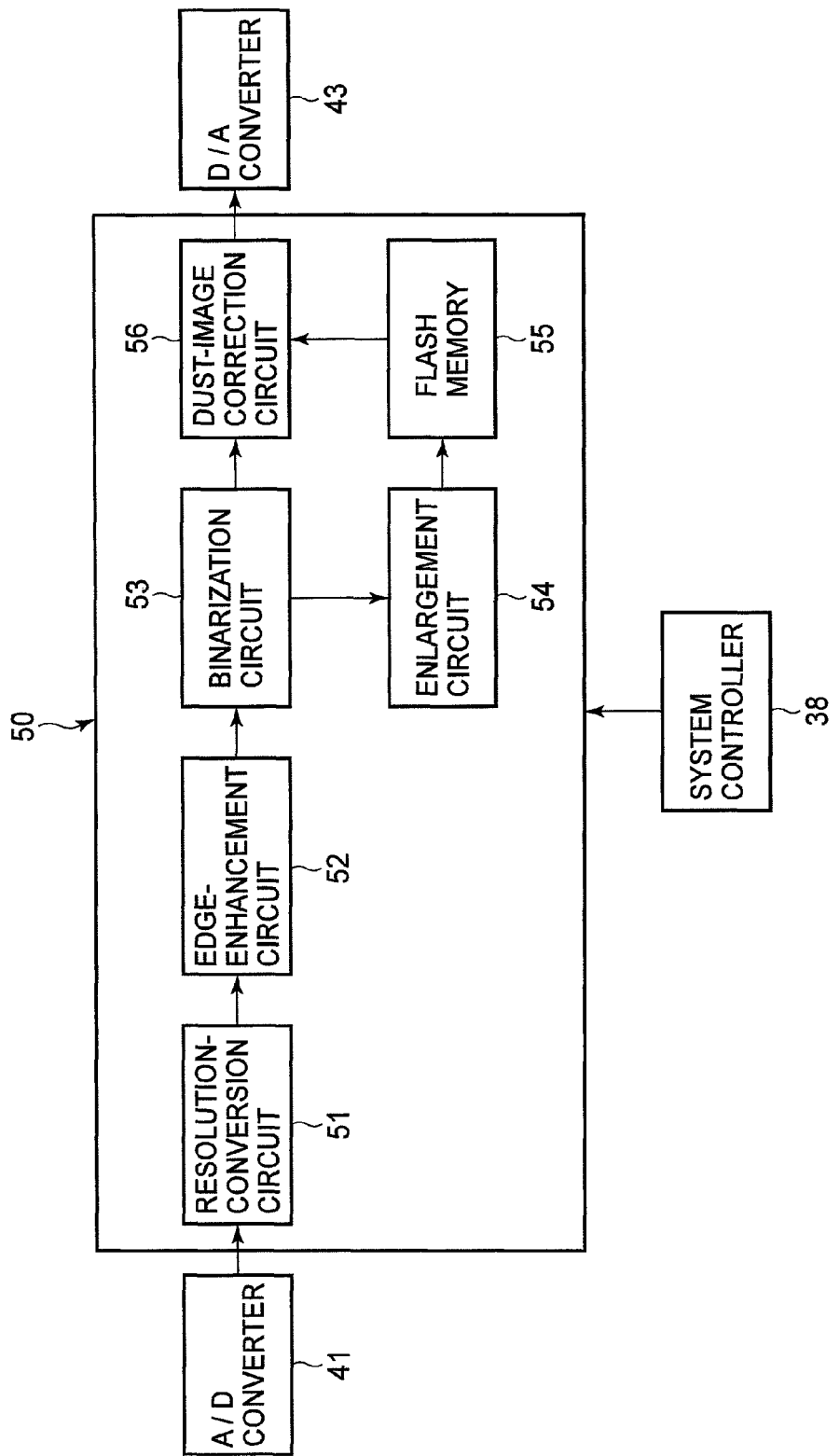
FIG. 3 is a block diagram showing the internal structure of the dust-image processing block of the first embodiment.

Next, predetermined data processing carried out by the dust-image processing block 50 is explained in detail below with an explanation of the structure of the dust-image processing block 50. As shown in FIG. 3, the dust-image processing block 50 comprises a resolution-conversion circuit 51, an edge-enhancement circuit 52, a binarization circuit 53 (dust extraction block), an enlargement circuit 54, a flash memory 55 (memory), and a dust-image correction circuit 56 (image correction block).

The normal dust-image data output from the A/D converter 41 is input to the resolution-conversion circuit 51. The resolution-conversion circuit 51 lowers the image resolution of the normal dust-image data, reducing the number of pixels in the normal dust-image data from the effective number of pixels of the imaging device 33. For example, the image resolution is lowered from megapixels to VGA resolution. By lowering image resolution, images of very minute dust that would not be recognized in usual photographing circumstances can be deleted.

The normal dust-image data with reduced resolution is transmitted to the edge-enhancement circuit 52. The edge-enhancement circuit 52 carries out edge-enhancement processing on the received normal dust-image data, and the sharpness of the photographed optical image is enhanced.

The normal dust-image data having undergone edge-enhancement processing is transmitted to the binarization circuit 53. First, the binarization circuit 53 calculates the average luminance and standard deviation, hereinafter referred to as $\sigma$, of the luminance data component of each pixel of normal dust-image data. The average luminance is the average of data levels of luminance data components of the normal dust-image data.

Following the calculation of the average luminance and $\sigma$, the binarization circuit 53 converts the value of the luminance data component of each pixel to either the lowest or highest level allowed by the image-processing block 50, which are 0 and 255, respectively, in this embodiment. A value originally greater than or equal to a first value, calculated as the average luminance plus $n \times \sigma$ (n being a positive integer), or less than or equal to a second value, calculated as the average luminance minus $n \times \sigma$, is converted into the lowest level. On the other hand, a value originally greater than the second value and less than the first value is converted to the highest level.

As long as a pattern-less subject is photographed in the dust-alert mode, it can generally be expected that the value of the luminance data component of a pixel used to produce an optical image will ranges between the second and first values if it is not dust. Therefore, pixels binarized to the lowest level are expected to correspond to locations where dust is attached. On the other hand, the pixels binarized to the highest level are expected to correspond to locations where there is no dust. Consequently, optical images exclusively of dust are extracted by selecting the pixels whose binarized value is the lowest level.

The normal dust-image data binarized by the binarization circuit 53 is transmitted to the dust-image correction circuit 56. The dust-image correction circuit 56 generates the corrected dust-image data by correcting the received normal dust-image data using the intrinsic-flaw image data stored in the flash memory 55.

Figure 4:
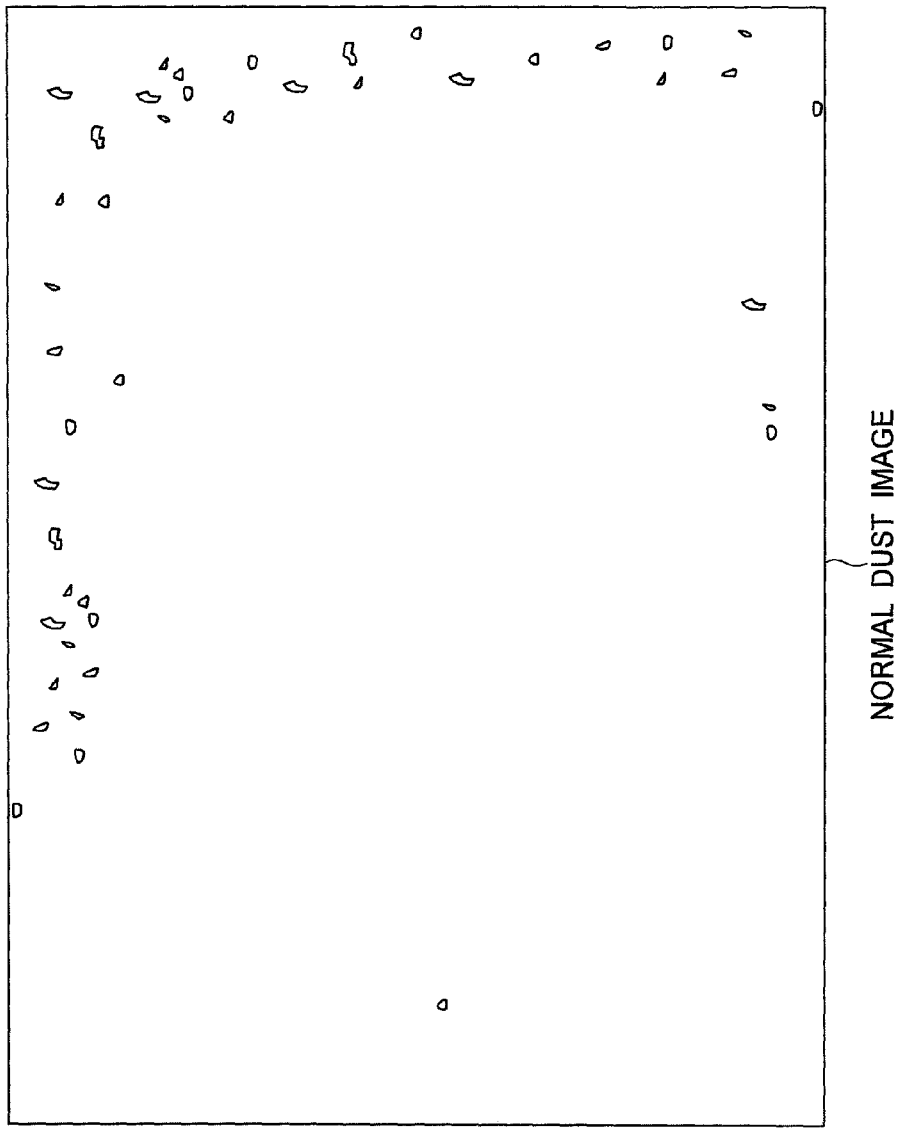
FIG. 4 illustrates a normal dust image.

The correction of the normal dust-image data is explained in detail below. When a pattern-less subject is photographed in the dust-alert mode, a normal dust image (including a plurality of sub-images of some dust as shown in FIG. 4) is captured by the imaging device 33. The normal dust image includes not only sub-images of removable dust but also sub-images of irremovable minute flaws generated on the infrared cut filter and optical low-pass filter and irremovable minute dust existing between the imaging device and the infrared cut filter and between the infrared cut filter and the optical low-pass filter.

During the adjustment process by the manufacturer, a complete optical image, including only the sub-images of the irremovable minute flaws and minute dust were captured as an intrinsic-flaw image. The intrinsic-flaw image data on the basis of the intrinsic-flaw image captured by the imaging device 33 is stored in the flash memory 55. Incidentally, as described above, the flash memory 55 receives and stores information on the photographic optical system 22.

The intrinsic-flaw image data is generated according to the following method and stored in the flash memory 55.

First, in the initializing operation after manufacturing the digital camera 10, the parameters of the lens unit 20 is adjusted properly for generating the intrinsic-flaw image signal. The parameter chosen for generating the intrinsic-flaw image signal is one which allows the imaging device 33 to capture an image in which the periphery of the image is sharper than with the parameter intended for use in the dust-alert mode. For example, the largeness of the aperture of the diaphragm 23 is adjusted so that the F-number of the photographic optical system 22 is F22.

In the initializing operation, a pattern-less subject is selected and photographed, as in the dust-alert mode. Because the initializing operation is carried out in a clean room which is generally assumed to have no dust, a complete image captured as the intrinsic-flaw image in the initializing operation contains sub-images only of irremovable minute flaws and minute dust.

The image signal generated based on the capture of the intrinsic-flaw image is transmitted to the A/D converter 41, the resolution-conversion circuit 51, the edge-enhancement circuit 52, and the binarization circuit 53 in order, and the respective circuits carry out the data processing described above on the image data, as in the dust-alert mode.

The image data on which the binarization circuit 53 carries out extraction data processing for extracting the intrinsic-flaw image is transmitted to the enlargement circuit 54, unlike in the dust-alert mode.

The enlargement circuit 54 enlarges each extracted dust image. For example, the original sub-image of dust is enlarged by one, two, or three pixels out from the center of the sub-image of dust, as shown in FIG. 5.

The location and size of a captured sub-image of dust vary according to the parameter of the lens unit 20. The original sub-image of each dust is enlarged so that sub-images of dust in the intrinsic-flaw image can be deleted from the normal dust image even if the parameters of the lens unit 20 are changed. The degree of enlargement of sub-images of dust in the intrinsic-flaw image is determined according to the difference in parameters between the initializing operation and the dust-alert mode.

An example of the magnification determination method is given below. There are different kinds of lens units 20 and the adjustment ranges on lens parameters differ according to the lens unit 20. The size of the aperture of the diaphragm 23 and the location of the exit pupil in the dust-alert mode are predetermined according to the kind of the lens unit 20.

The magnification is determined in proportion to the aperture size of the diaphragm 23 in the dust-alert mode compared to the size of the aperture in the initializing operation. In addition, the magnification is determined in inverse proportion to the distance between the location of the exit pupil in the dust-alert mode and the light-receiving surface of the imaging device 33 compared to the distance in the initializing operation.

A detected-flaw area where each sub-image of dust is located in the entire intrinsic-flaw image is enlarged, and the enlarged detected-flaw area is defined as an intrinsic-flaw area. By the enlargement, the enlargement circuit 54 generates the intrinsic-flaw image data that has pixel data with a 0 luminance level components and located in the intrinsic-flaw area and pixel data having a luminance component 255 elsewhere.

Figure 6:
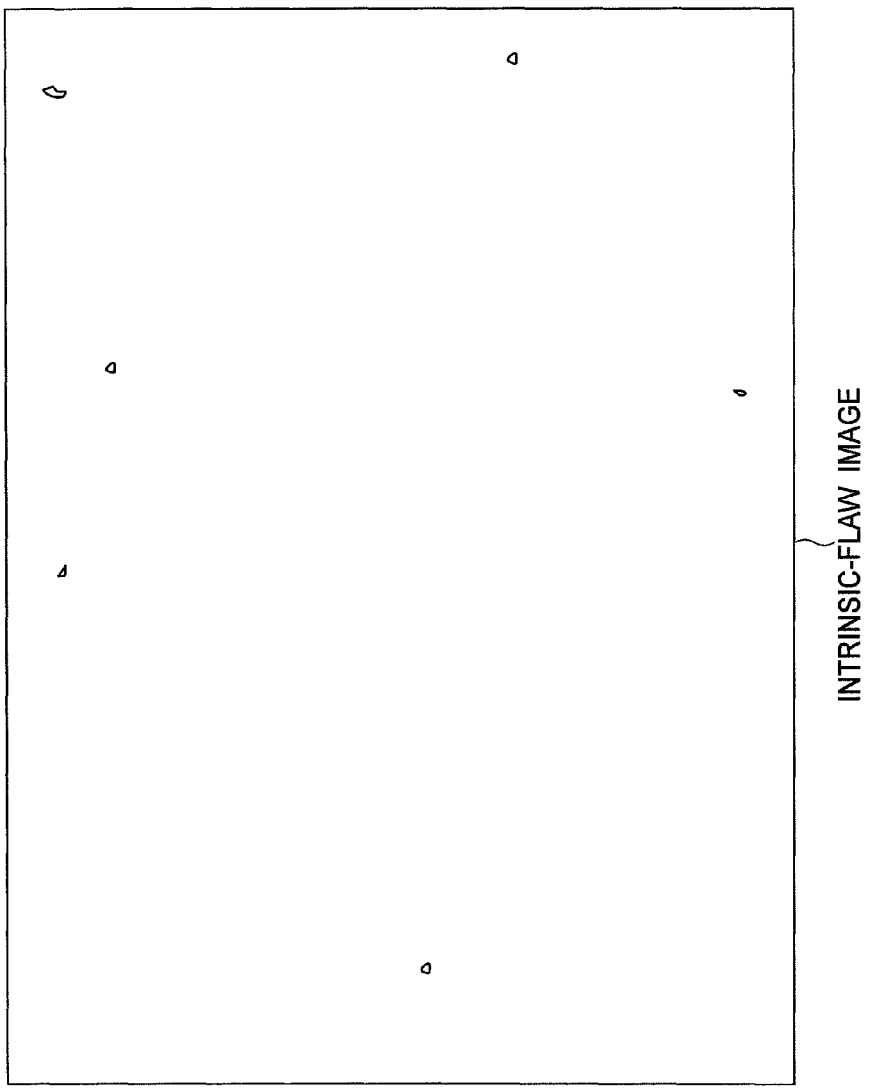
FIG. 6 depicts an intrinsic-flaw image.
Figure 7:
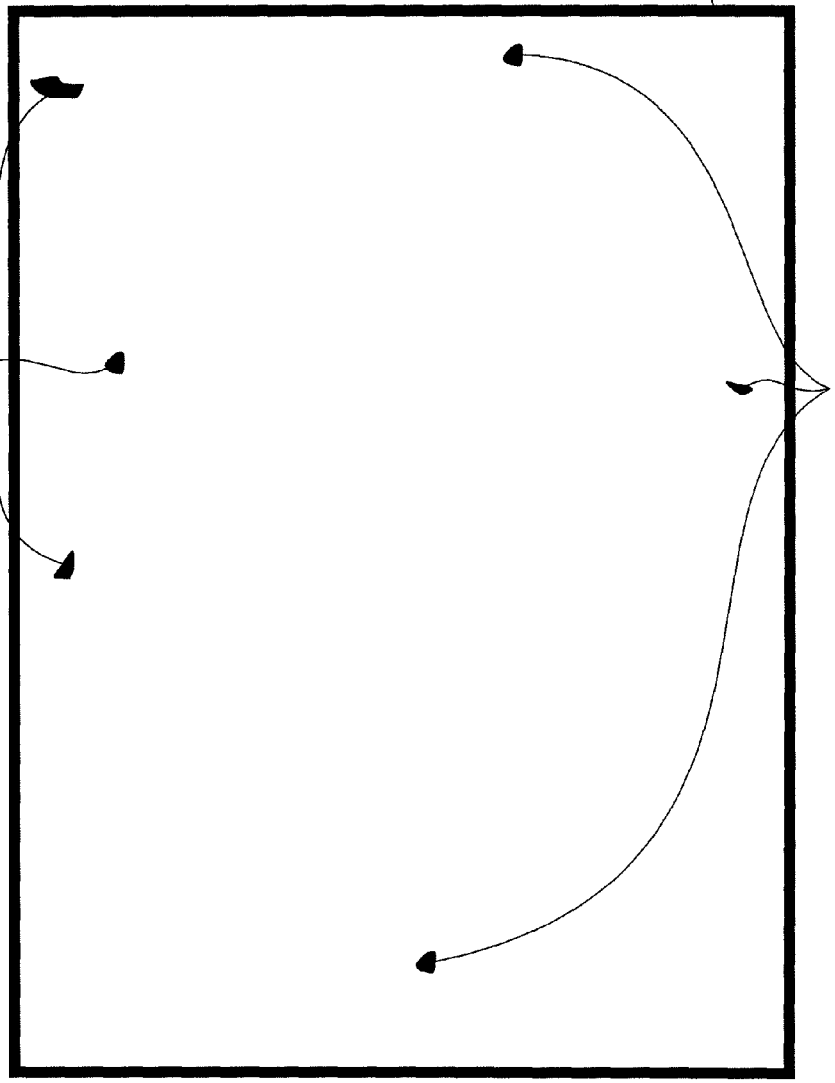
FIG. 7 depicts the intrinsic-flaw areas.

For example, on the basis of the intrinsic-flaw image as shown in FIG. 6, an image signal corresponding to the entire image including original sub-images of each dust having being enlarged and blackened (see FIG. 7) is generated and stored as the intrinsic-flaw image data in the flash memory 55. In addition, an area with a frame enclosing an originally captured entire image and having a first width is also determined as the intrinsic-flaw area. The intrinsic-flaw image data stored in the flash memory 55 is read by the dust-image correction circuit 56 when the dust-image correction circuit 56 receives the normal dust-image data.

Figure 8:
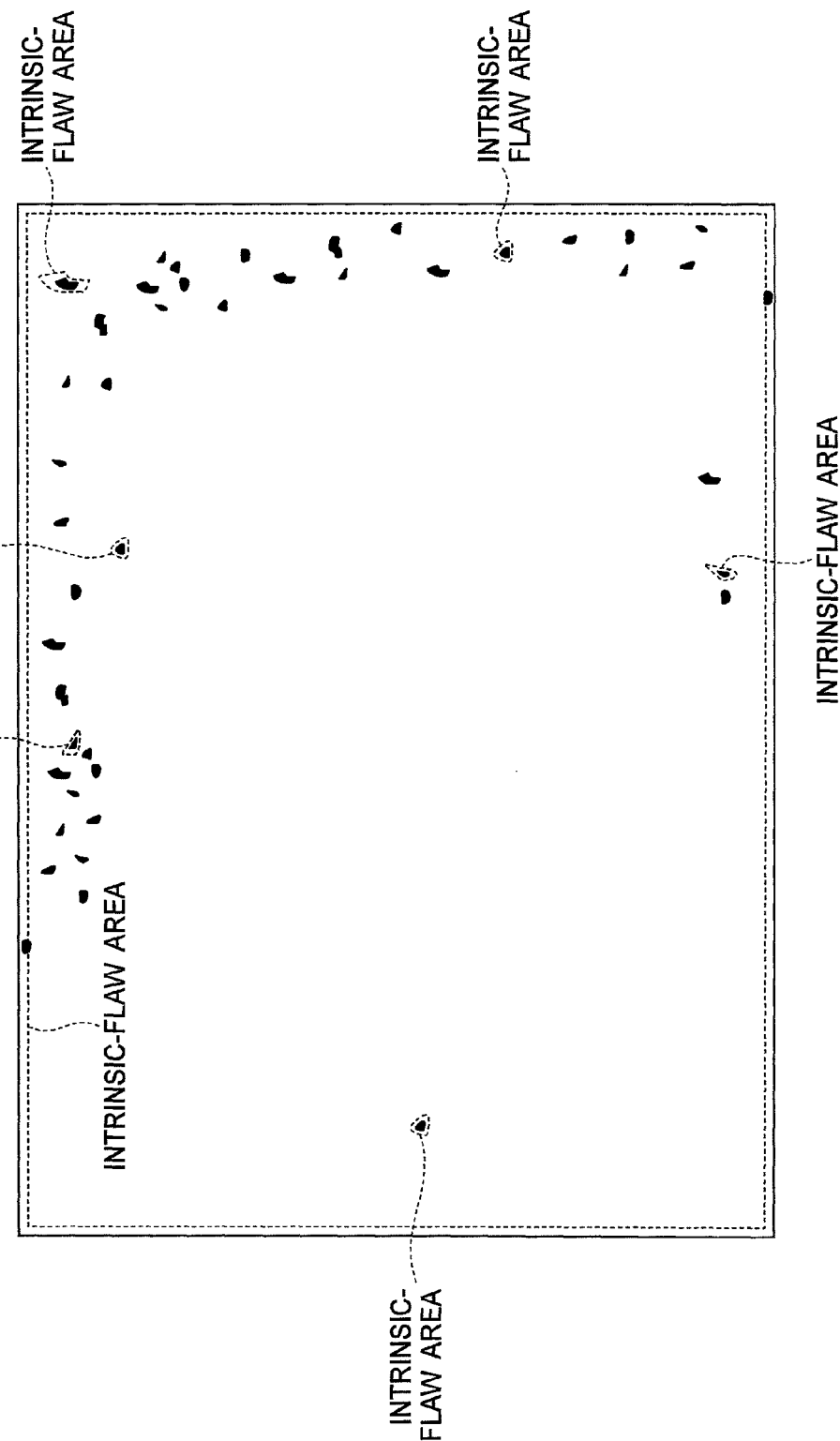
FIG. 8 illustrates a normal dust image with locally blackened sub-images of dust.

In the normal dust-image data input to the dust-image correction circuit 56, the value of the luminance data component of a pixel located in the sub-image of each dust particle is zero, and as shown in FIG. 8, a sub-image of each dust particle is represented as black. The dust-image correction circuit 56 converts the data level of the luminance data component for a pixel located in the same area as the intrinsic-flaw area in the normal dust-image data into 255.

Figure 9:
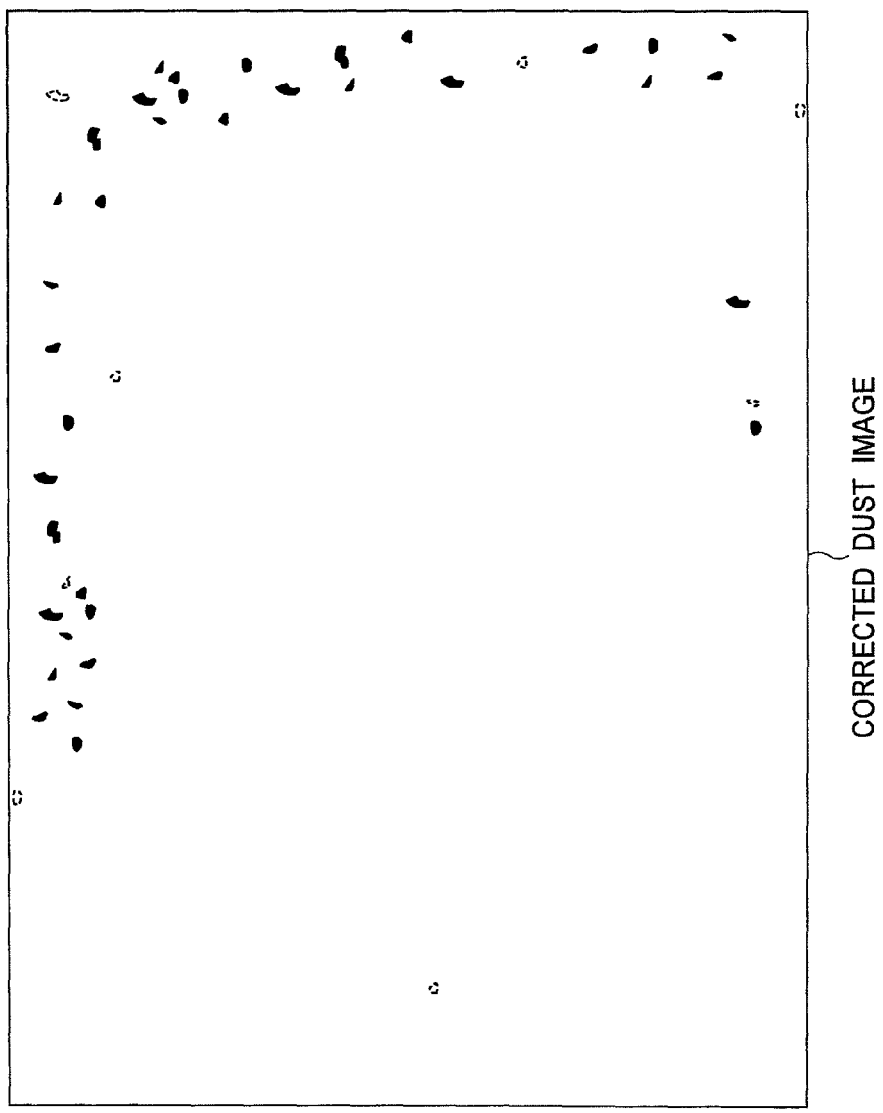
FIG. 9 illustrates a corrected dust image.

By the conversion of the luminance data component, a sub-image of dust detected in the intrinsic-flaw area is deleted from the normal dust image. Then, the corrected dust-image data corresponding to a corrected dust image, as shown in FIG. 9, which a sub-image of dust located in the intrinsic-flaw area (see broken line) is deleted from the normal dust image. As described above, the corrected dust-image signal is transmitted to the monitor 34 via the D/A converter 43, and the corrected dust image is displayed on the monitor 34.

Figure 10:
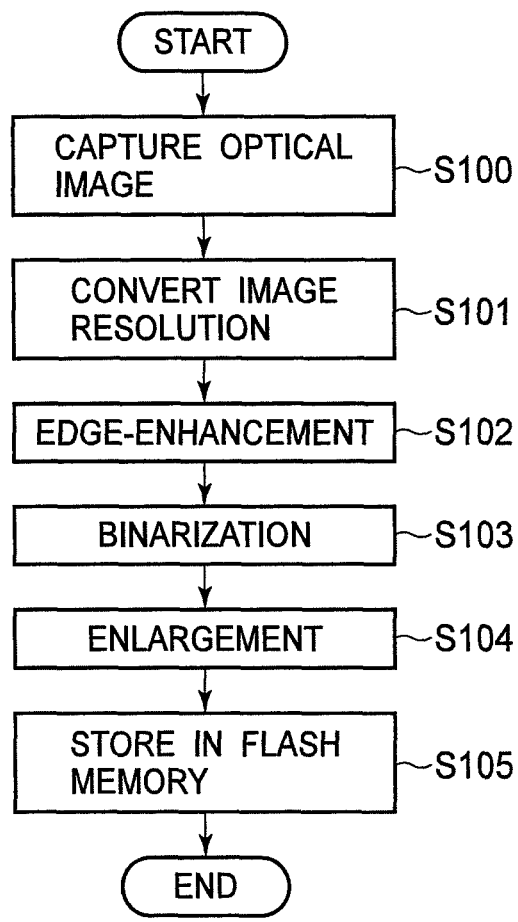
FIG. 10 is a flowchart illustrating the processes carried out by the system controller to generate the intrinsic-flaw image signal and to store it in the flash memory in the first embodiment.

Next, the processes carried out by the system controller 38 to generate the intrinsic-flaw image data in the first embodiment are explained using the flowchart of FIG. 10.

The intrinsic-flaw image data is generated and stored in the flash memory 55 in the initializing operation after manufacturing the camera block 30, as described above. Before the initializing operation, an initialization lens, set to an F-number of F22 (equivalent to an aperture value of 9) and with the exit pupil adjusted to a predetermined location, is connected to the camera block 30 by the manufacturer. In addition, the digital camera 10 is fixed so that an optical image of a pattern-less subject incident on the imaging device 33 occupies the entire effective imaging area.

Under such parameters, the intrinsic-flaw image data is started to be generated. At step S100, the system controller 38 drives the imaging device 33 to generate an image signal corresponding to an entire optical image captured by the imaging device 33. The generated image signal is controlled to be transmitted to the dust-image processing block 50.

At step S101, the system controller 38 orders the resolution-conversion circuit 51 in the dust-image processing block 50 to convert the image resolution of the received image data into VGA.

At step S102 following step S101, the system controller 38 orders the edge-enhancement circuit 52 to carry out edge-enhancement processing on the image data.

After edge-enhancement processing, the process proceeds to step S103. At step S103, the system controller 38 orders the binarization circuit 53 to binarize luminance data components of a plurality of pixel data which the image data consists of.

At step S104 following step S103, the system controller 38 orders the enlargement circuit 54 to generate the intrinsic-flaw image data by enlarging the detected-flaw area having been extracted based on the binarized luminance data components.

After generating the intrinsic-flaw image data, the process proceeds to step S105. At step S105, the system controller 38 orders the flash memory 55 to store the generated intrinsic-flaw image data. The process terminates when the intrinsic-flaw image data is stored.

Figure 11:
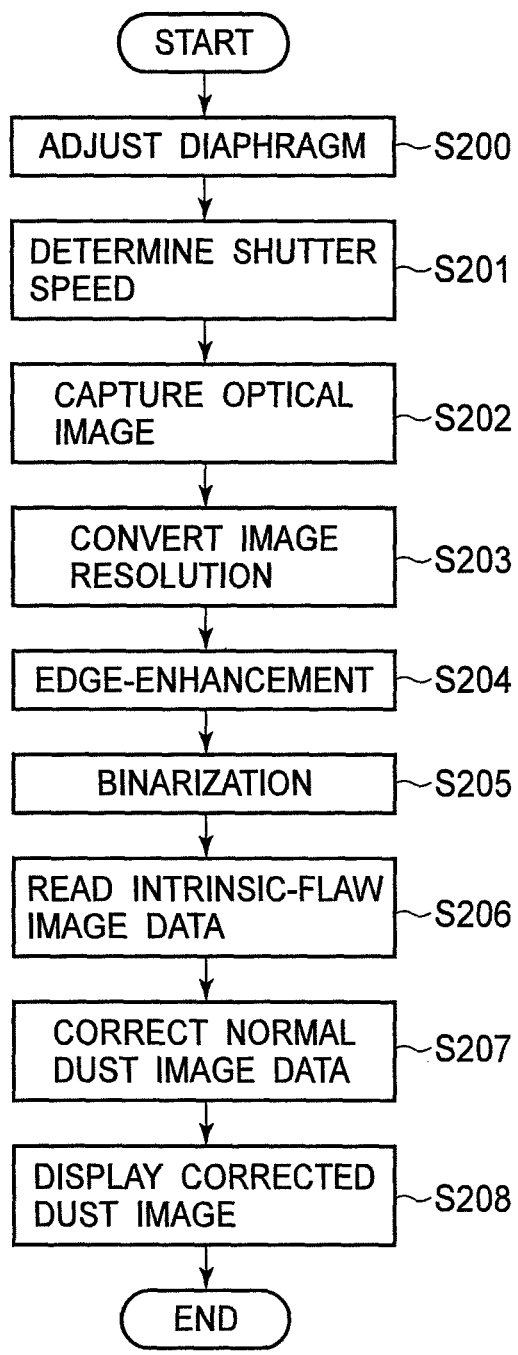
FIG. 11 is a flowchart illustrating the processes carried out by the system controller in the dust-alert mode of the first embodiment.

Next, the processes carried out by the system controller 38 in the dust-alert mode in the first embodiment are explained using the flowchart of FIG. 11.

The process in the dust-alert mode commences when the user inputs a command to commence the dust-alert mode to the input block 37. Before commencing the dust-alert mode, the digital camera 10 is fixed so that an optical image of a pattern-less subject incident on the imaging device 33 occupies the entire effective imaging area.

At step S200, the system controller 38 orders the lens-unit driving mechanism 21 to adjust the size of the aperture of the diaphragm 23 so that the F-number of the photographic optical system 22 be F16.

After adjusting the size of the aperture, the process proceeds to step S201. At step S201, the system controller 38 determines a shutter speed so that the exposure is proper for the chosen aperture size.

After determination of the shutter speed, the process proceeds to step S202. At step S202, the system controller 38 drives the imaging device 33 to capture an image to be treated as a normal dust-image signal, as in step S100. In addition, the generated normal dust-image signal is transmitted to the dust-image processing block 50.

At steps S203-S205, the system controller 38 orders the resolution-conversion circuit 51, the edge-enhancement circuit 52, and the binarization circuit 53 to carry out the conversion of image resolution of the normal dust-image data, edge-enhancement processing, and the binarization of luminance data components, as in steps S101-S103.

After the binarization of luminance data components, the process proceeds to step S206. At step S206, the system controller 38 orders the dust-image correction circuit 56 to read the intrinsic-flaw image data stored in the flash memory 55.

At step S207 following step S206, the system controller 38 orders the dust-image correction circuit 56 to generate the corrected dust-image data by correcting the normal dust-image data having undergone data processing at steps S203-S205 using the intrinsic-flaw image data read at step S206.

After finishing the correction of the normal dust-image data, the process proceeds to step S208. At step S208, the system controller 38 orders the image-processing block 40 to output the corrected dust-image signal to the monitor 34, and the system controller 38 orders the monitor 34 to display the corrected dust image. The process in the dust-alert mode terminates when the corrected dust image is displayed on the monitor 34.

In the above first embodiment, dust introduced after the intrinsic-flaw image was captured can be detected.

In addition, in the above first embodiment, a sub-image of dust located in the intrinsic-flaw area, which is enlarged from the detected-flaw area, is deleted. If the parameters of the lens unit 20 change, the size and the location of flaws and dust also change. However, in the above first embodiment, a sub-image of dust located at the intrinsic-flaw area is deleted. Consequently, even though the parameters may differ from ones in the initializing operation, a sub-image of flaws and dust in the intrinsic-flaw image can be adequately removed.

In addition, in the above first embodiment, a sub-image of dust located in the area of the frame defined as the intrinsic-flaw area is deleted from the normal dust image. In the capture of the normal dust image, the greater the distance between the exit pupil and the light-receiving surface of the imaging device 33, the closer to the optical axis sub-images will appear on the sensor. Accordingly, a sub-image of dust which was not included in the intrinsic-image due its distance from the optical axis during the initializing operation may appear to approach the optical axis in the normal dust image if the exit pupil distance changes. Against such a phenomenon, in the above first embodiment, some sub-images of dust which are not captured in the entire intrinsic-flaw image are deleted from the normal dust image by deleting a sub-image of dust located in the area of the frame determined as the intrinsic-flaw area.

In addition, in the above first embodiment, the size of the aperture of the diaphragm 23 upon capturing the intrinsic-flaw image is determined so that the F-number be F22, and it is smaller than the size of the aperture upon capturing the normal dust image, which is determined so that the F-number be F16. Accordingly, some of the dust, which is blurred and indistinguishable in the normal dust image, is distinguishable in an intrinsic-flaw image. Consequently, sub-images of dust in the entire intrinsic-flaw image can be sufficiently deleted among visible sub-images of dust in the entire normal dust image.

Next, a digital camera having a dust detection system of the second embodiment is explained. The primary difference between the second embodiment and the first embodiment is the method of determining an intrinsic-flaw area. The second embodiment is explained mainly with reference to the structures that differ from those of the first embodiment. Here, the same index numbers are used for the structures that correspond to those of the first embodiment.

The digital camera 10 in the second embodiment comprises a lens unit 20 and a camera block 30, as in the first embodiment. In addition, the lens unit 20 comprises a lens-unit driving mechanism 21 and a photographic optical system 22, as in the first embodiment. In addition, the camera block 30 contains a mirror 32, an imaging device 33, a monitor 34, an image-processing block 40, a pentaprism 35, an eyepiece 36, and other components in a body 31, as in the first embodiment. The structures and functions of these components in the camera block 30 except for the image-processing block 40 are the same as those of the first embodiment.

Some information stored in a lens memory 24 of the lens unit 20 is used in the dust-alert mode, unlike in the first embodiment. The lens-unit driving mechanism 21 comprises a lens sensor that detects the locations of the focus lens and the zoom lens and a diaphragm sensor that detects the aperture size of the diaphragm 23. The detected locations of the focus lens and the zoom lens are stored as location data in the lens memory 24. In addition, the detected size of the aperture is also stored as Av data in the lens memory 24.

The image-processing block 40 comprises an A/D converter 41, a normal-image processing block 42, a dust-image processing block 500, and a D/A converter 43, as in the first embodiment. The structure of the dust-image processing block 500 in the second embodiment is different from the first embodiment.

Figure 12:
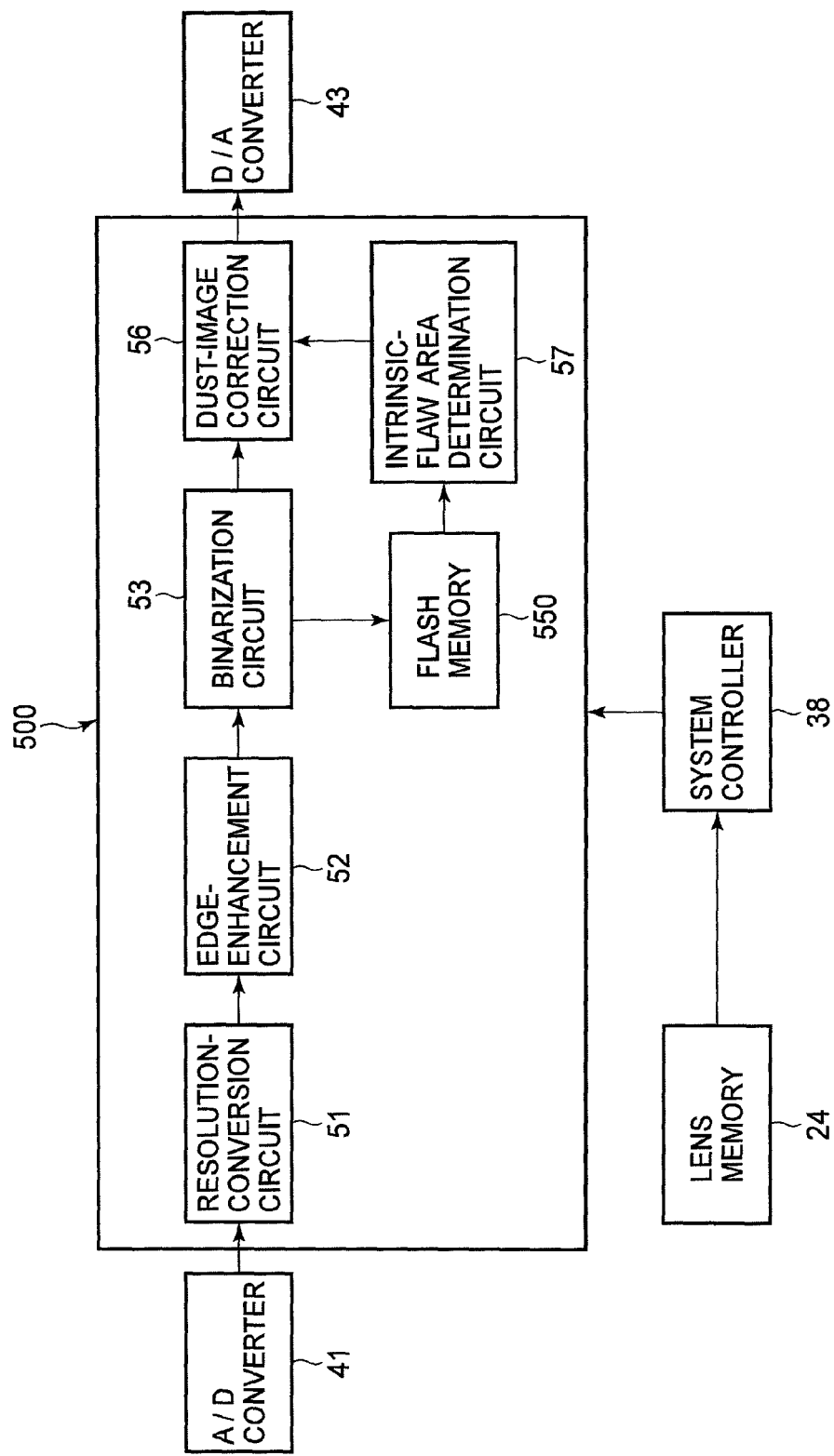
FIG. 12 is a block diagram showing the internal structure of the dust-image processing block in the second embodiment.

As shown in FIG. 12, the dust-image processing block 500 comprises resolution-conversion circuit 51, an edge-enhancement circuit 52, a binarization circuit 53, a dust-image correction circuit 56, a flash memory 550, and an intrinsic-flaw area determination circuit 57.

The functions of the resolution-conversion circuit 51, the edge-enhancement circuit 52, the binarization circuit 53, and the dust-image correction circuit 56 are the same as those of the first embodiment. Accordingly, the resolution-conversion circuit 51 converts the image resolution of normal dust-image data, the edge-enhancement circuit 52 carries out edge-enhancement processing, the binarization circuit 53 binarizes luminance data components of the normal dust-image data, and the normal dust-image correction circuit 56 corrects the normal dust-image data on the basis of an intrinsic-flaw image data stored in the flash memory 550.

The method of generating an intrinsic-flaw image data and the method of determining an intrinsic-flaw area in the second embodiment are different from those of the first embodiment. The flash memory 550 is directly connected to the binarization circuit 53, unlike in the first embodiment. An intrinsic-flaw image is captured under the same parameters of the lens unit 20 as those of the first embodiment, and the A/D converter 41, the resolution-conversion circuit 51, the edge-enhancement circuit 52, and the binarization circuit 53 carry out data processing on the generated image signal based on the captured image.

The binarized image data is stored as an intrinsic-flaw image data in the flash memory 550, unlike in the first embodiment. Image data corresponding to an entire image (see FIG. 6) including original sub-images of each dust particle having been blackened is stored as the intrinsic-flaw image data in the flash memory 550 in the second embodiment while image data corresponding to an entire image including original sub-images of each dust particle having been enlarged and blackened (see FIG. 7) is stored as the intrinsic-flaw image data in the flash memory 55 in the first embodiment.

The Av data and the location data of the exit pupil of the initialization-lens are written to the flash memory 550 in the initializing operation, unlike in the first embodiment.

When the dust-alert mode is carried out, the intrinsic-flaw area determination circuit 57 reads the intrinsic-flaw image data, the Av data, and the location data of the exit pupil stored in the flash memory 550.

In addition, when the dust-alert mode is carried out, the intrinsic-flaw area determination circuit 57 reads the location data and the Av data, which correspond to the location of the focus lens and the aperture value of the diaphragm 23, respectively, for the current attached interchangeable lens upon capturing the normal dust image from the lens memory 24 via the system controller 38. The intrinsic-flaw area determination circuit 57 determines the location of the exit pupil upon capturing the normal dust image on the basis of the location of the focus lens.

Next, the intrinsic-flaw area determination circuit 57 determines intrinsic-flaw areas where sub-images of dust should be deleted from the entire normal dust image on the basis of the read data. The intrinsic-flaw areas are determined by enlarging detected-flaw areas where each sub-image of dust is located in the entire intrinsic-flaw image on the basis of the aperture value and the location of the exit pupil.

Figure 13:
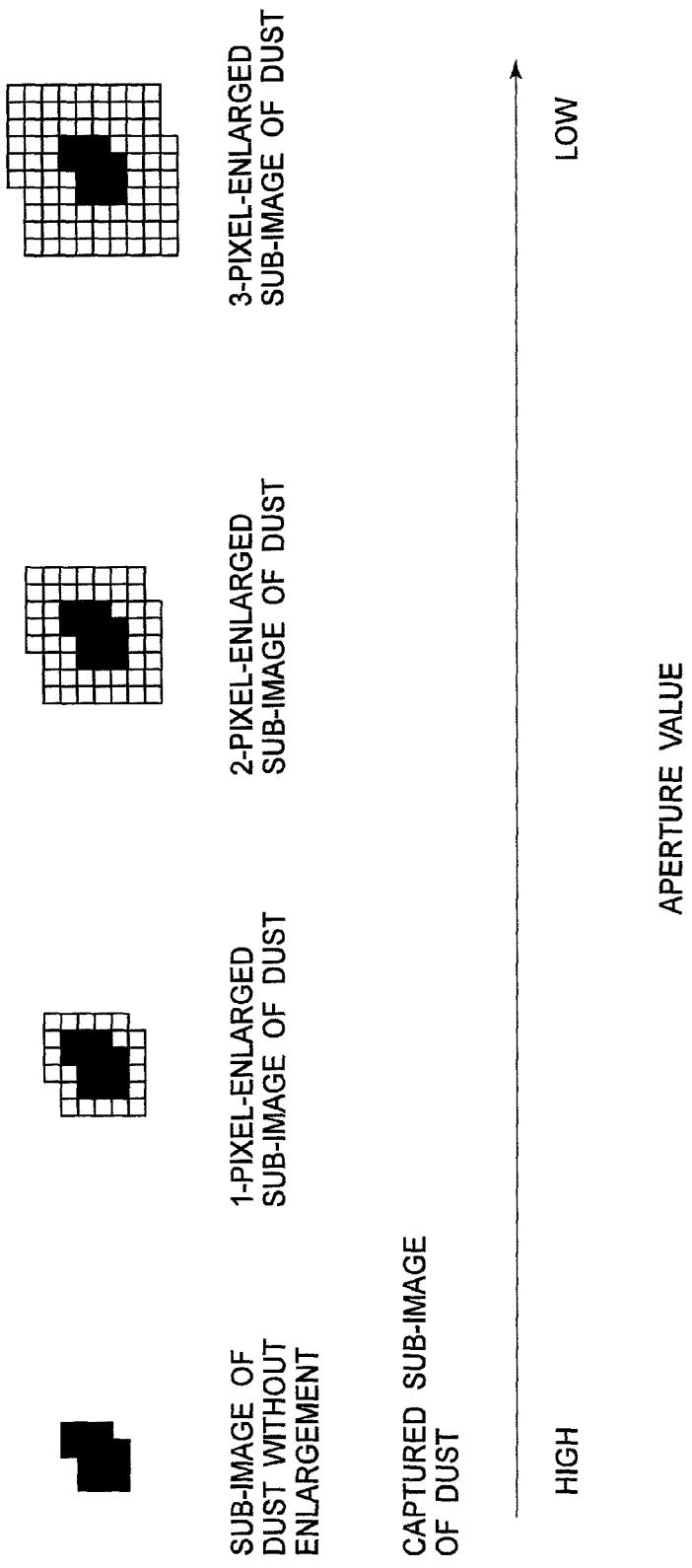
FIG. 13 shows the relation between the enlargement of the detected-flaw area and the aperture value.

As shown in FIG. 13, each of the detected-flaw areas is enlarged in inverse proportion to the aperture value upon capturing the normal dust image compared with that upon capturing the intrinsic-flaw image.

Figure 14:
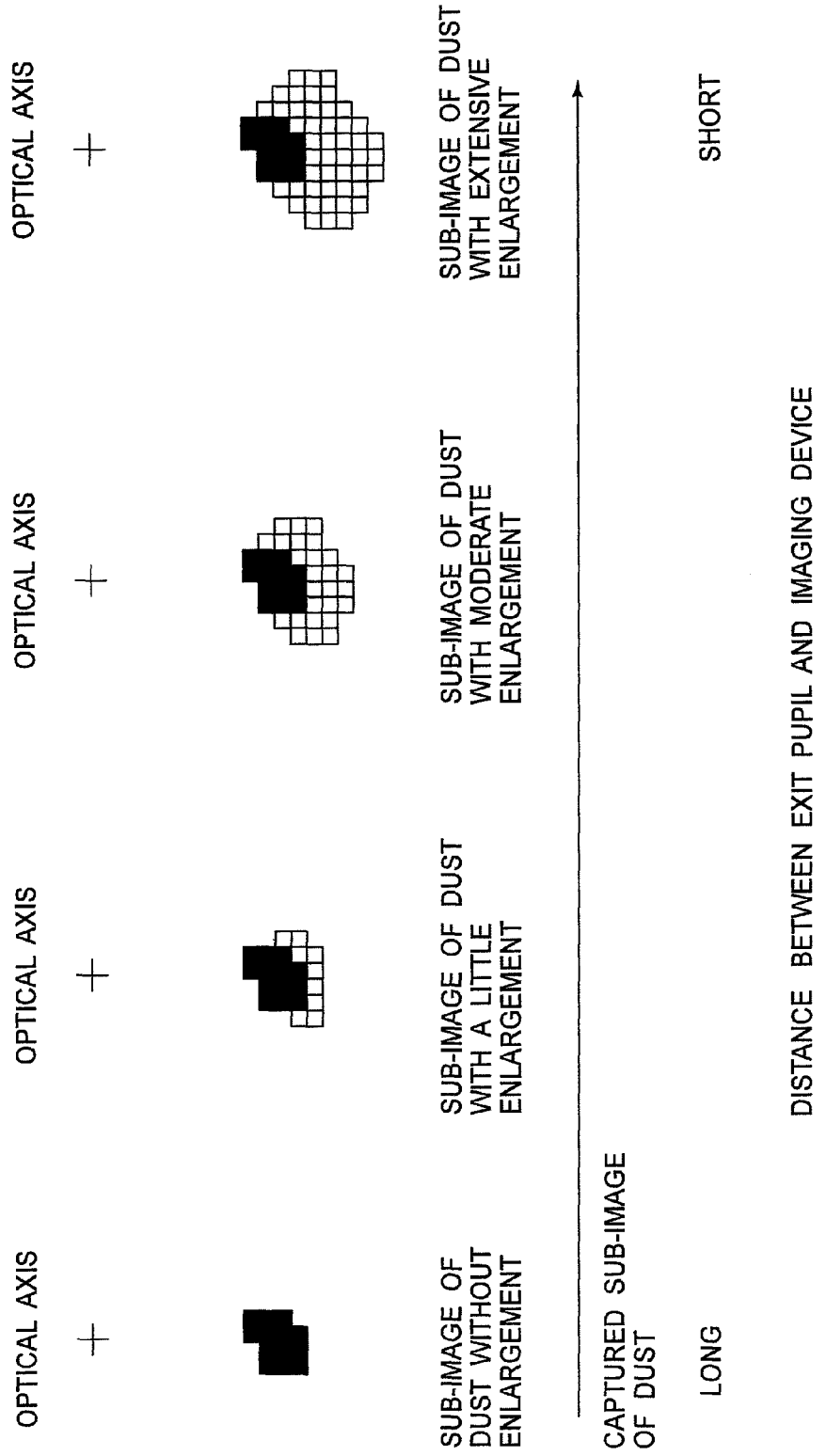
FIG. 14 shows the relation between the enlargement of the detected-flaw area and the distance between the exit pupil and the imaging device.

As shown in FIG. 14, each of the detected-flaw area is enlarged in the direction opposite to the intersection point of an optical axis of the photographic optical system 22 and the imaging device 33 in inverse proportion to the distance between the location of the exit pupil and the light-receiving surface of the imaging device 33 upon capturing the normal dust image compared with that upon capturing the intrinsic-flaw image.

Figure 15:
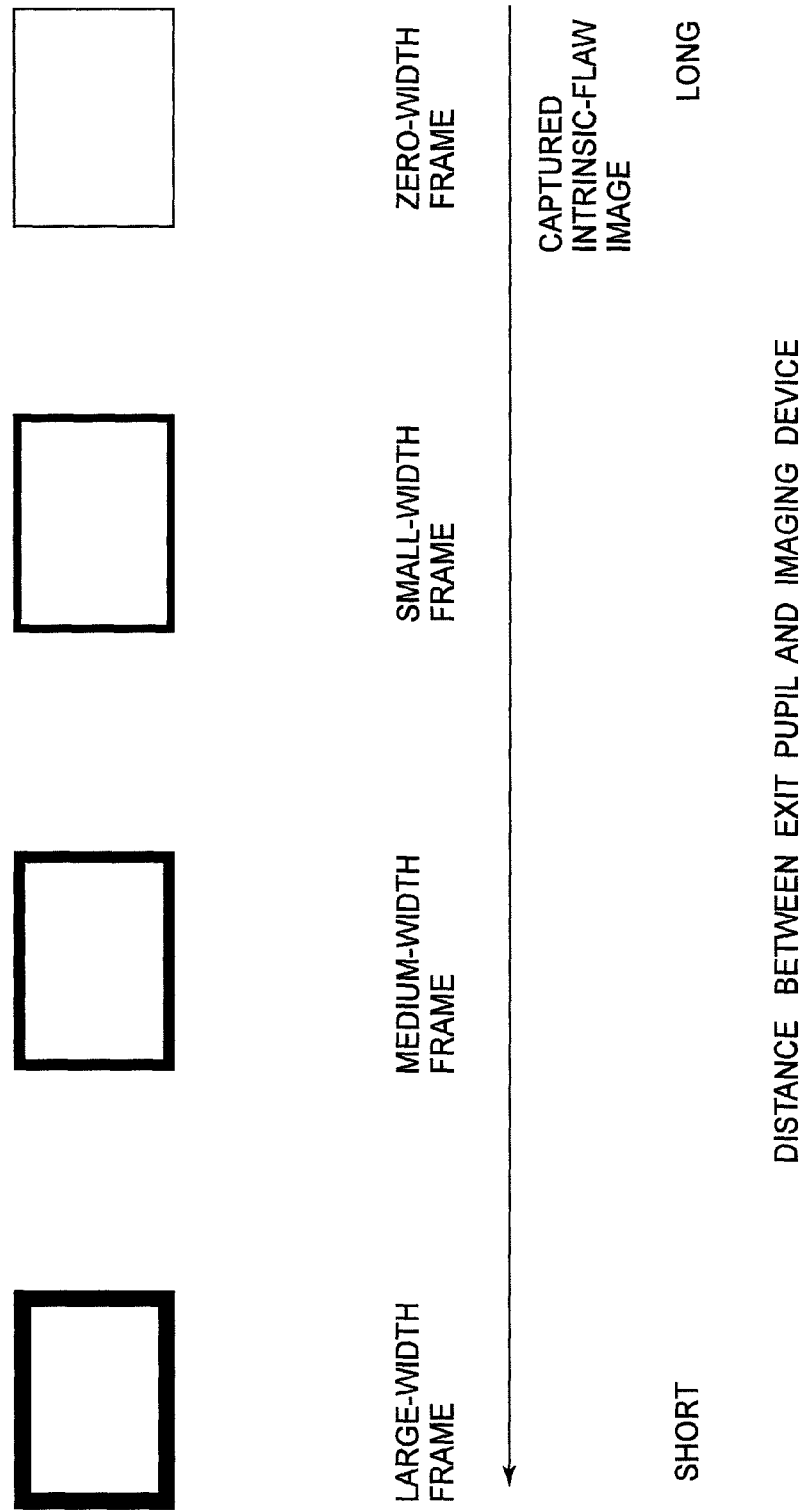
FIG. 15 shows the relation between the width of the frame determined as the intrinsic-flaw area and the distance from the location of the exit pupil to the imaging device.

In addition, as shown in FIG. 15, a frame area to be determined as the intrinsic-flaw area is widened in inverse proportion to the distance between the location of the exit pupil and the light-receiving surface of the imaging device 33 upon capturing the normal dust image compared with that upon capturing the intrinsic-flaw image.

Image data corresponding to an image where areas determined to be intrinsic-flaw areas are blackened is transmitted to the dust-image correction circuit 56, and the dust-image correction circuit corrects the normal dust-image data using the received image data, as in the first embodiment.

Figure 16:
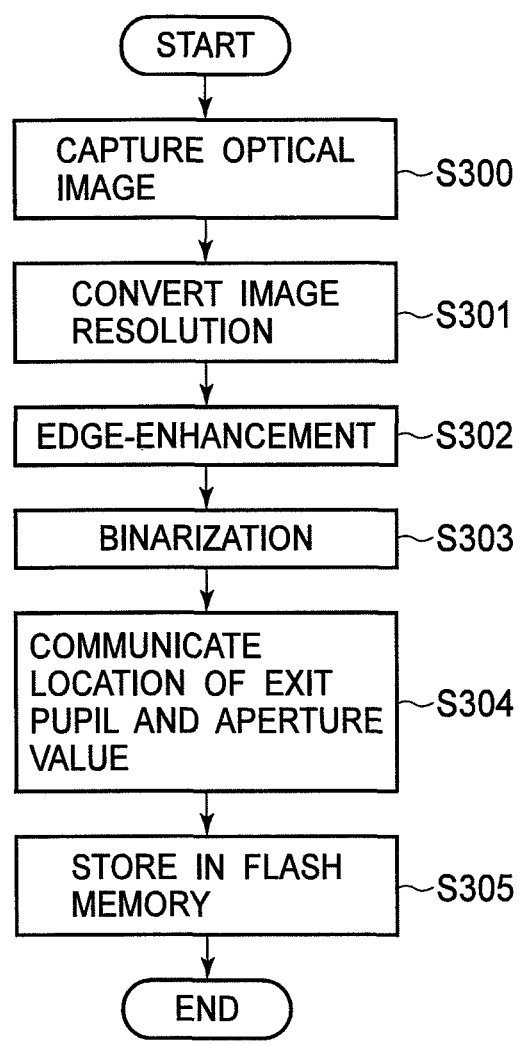
FIG. 16 is a flowchart illustrating the processes carried out by the system controller in the dust-alert mode in the second embodiment.

Next, the processes carried out by the system controller 38 to generate the intrinsic-flaw image data in the second embodiment are explained using the flowchart of FIG. 16.

Before the initializing operation, a lens set to an F-number of F22 and with the exit pupil is adjusted to a predetermined location for initializing operation is connected to the camera block 30 by a manufacturer, as in the first embodiment. In addition, the digital camera 10 is fixed so that an optical image of a pattern-less subject incident on the imaging device 33 occupies the entire effective imaging area.

Then, the intrinsic-flaw image data is started to be generated. At steps S300-S303, the system controller 38 controls the imaging device 33 and each of circuits so that predetermined data processing is carried out on an image signal generated based on a captured intrinsic-flaw image, as at steps S100-S103 in the first embodiment.

At step S304, the system controller 38 controls the lens memory 24 and the flash memory 550 so that the location of the exit pupil and the aperture value upon capturing an optical image at step S300 is communicated from the lens memory 24 to the flash memory 550 and stored as data in the flash memory 550.

At step S305, the system controller 38 orders the flash memory 550 to store image data having undergone predetermined data processing at steps S301 and S302 as an intrinsic-flaw image data. The process terminates when the intrinsic-flaw image data is stored in the flash memory 550.

Figure 17:
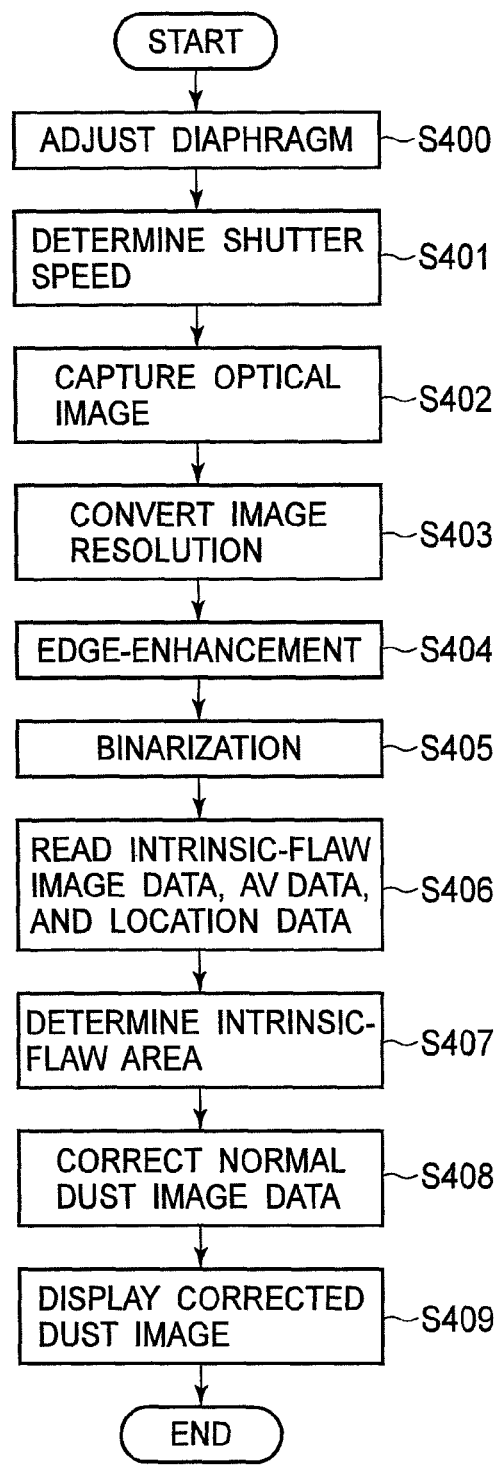
FIG. 17 is a flowchart illustrating the processes carried out by the system controller in the dust-alert mode in the second embodiment.

Next, the processes carried out by the system controller 38 in the dust-alert mode in the second embodiment are explained using the flowchart of FIG. 17.

The process in the dust-alert mode commences when the user inputs a command to commence the dust-alert mode to the input block 37. Before commencing the dust-alert mode, the digital camera 10 is fixed so that an optical image of a pattern-less subject incident on the imaging device 33 occupies the entire effective imaging area.

At step S400, the system controller 38 orders the lens-unit driving mechanism 21 to adjust the size of the aperture of the diaphragm 23 so that the F-number of the photographic optical system 22 is the maximum F-number less than F22 within the adjustable range. At steps S401-S405 following to step S400, the system controller 38 orders each component to generate and to carry out predetermined data processing on a normal dust-image data, as at steps S201-S205 in the first embodiment.

After completing predetermined data processing on the normal dust-image data, the process proceeds to step S406. At step S406, the system controller 38 orders the intrinsic-flaw area determination circuit 57 to read the intrinsic-flaw image data, the Av data, and the location data from the flash memory 550. In addition, the system controller 38 orders the intrinsic-flaw area determination circuit 57 to read the Av data and the location data of the exit pupil from the lens memory 24 upon capturing an optical image at step S402.

At step S407 following step S406, the system controller orders the intrinsic-flaw area determination circuit 57 to determine the intrinsic-flaw areas on the basis of the normal dust-image data and some data read at step S406. At step S408 following step S407, the system controller 38 orders the dust-image correction circuit 56 to correct the normal dust-image data on the basis of the intrinsic-flaw areas determined at step S407 and to generate a corrected dust-image data.

When the correction of the normal dust-image data is complete, the process proceeds to step S409. At step S409, the system controller 38 orders the image-processing block 40 to output the corrected dust-image signal to the monitor 34, and the system controller 38 orders the monitor 34 to display the corrected dust image. The process in the dust-alert mode terminates when the corrected dust image is displayed on the monitor 34.

Also in the above second embodiment, dust introduced after the intrinsic-flaw image was captured can be detected.

In addition, in the above second embodiment, the sizes of the intrinsic-flaw area are determined according to the aperture value. The size of a sub-image of dust in the entire normal dust image has a size inversely proportional to the aperture value, which is equivalent to the F-number. The detected-flaw areas are enlarged in inverse proportion to the aperture value. Accordingly, even if the aperture value upon carrying out the dust-alert mode is different from that upon capturing the intrinsic-flaw image, sub-images of dust coming into the filters on manufacturing can be deleted from the normal dust image.

In addition, in the above second embodiment, the sizes of the intrinsic-flaw areas are determined according to the location of the exit pupil. The size and apparent distance from the optical axis, of a sub-image of dust in the normal dust image, increase the closer the exit pupil is to the light-receiving surface of the imaging device 33. The detected-flaw areas are enlarged more in the direction opposite the optical axis for closer locations of the exit pupil to the light-receiving surface. Accordingly, even if the location of the exit pupil upon carrying out the dust-alert mode is different from that upon capturing the intrinsic-flaw image, sub-images of dust coming into the filters on manufacturing can be deleted from the normal dust image.

In addition, in the above second embodiment, the width of the frame to be determined as the intrinsic-flaw area is determined according to the location of the exit pupil. The entire area of the image to be captured becomes large for an exit pupil farther away from the light-receiving surface of the imaging device 33. Accordingly, a sub-image of a flaw or dust not present in the intrinsic-flaw image may be captured as the normal dust image. However, the width of the frame is set larger with increasing distance of the exit pupil from the light-receiving surface, in the above second embodiment. As a result, sub-images of dust coming into the filters on manufacturing can be deleted from the normal dust image.

In addition, in the above second embodiment, the size of the aperture of the diaphragm 23 upon capturing the intrinsic-flaw image is varied appropriately and is smaller than that upon capturing the normal dust image, as in the first embodiment. Accordingly, sub-images of dust in the intrinsic-flaw image can be effectively deleted from between the visible sub-images of dust in the entire normal dust image.

Next, a digital camera having a dust detection system of the third embodiment is explained. The primary difference between the third embodiment and the first embodiment is the method of announcing that removable dust is attached. The third embodiment is explained mainly with reference to the structures that differ from those of the first embodiment. Here, the same index numbers are used for the structures that correspond to those of the first embodiment.

The digital camera 10 in the third embodiment comprises a lens unit 20 and a camera block 30, as in the first embodiment. In addition, the lens unit 20 comprises a lens-unit driving mechanism 21 and a photographic optical system 22, as in the first embodiment. In addition, the camera block 30 contains a mirror 32, an imaging device 33, a monitor 34, an image-processing block 400, a pentaprism 35, an eyepiece 36, and other components, in a body 31, as in the first embodiment. The structures and functions of these components in the camera block 30 except for the image-processing block 400 are the same as those of the first embodiment.

Figure 18:
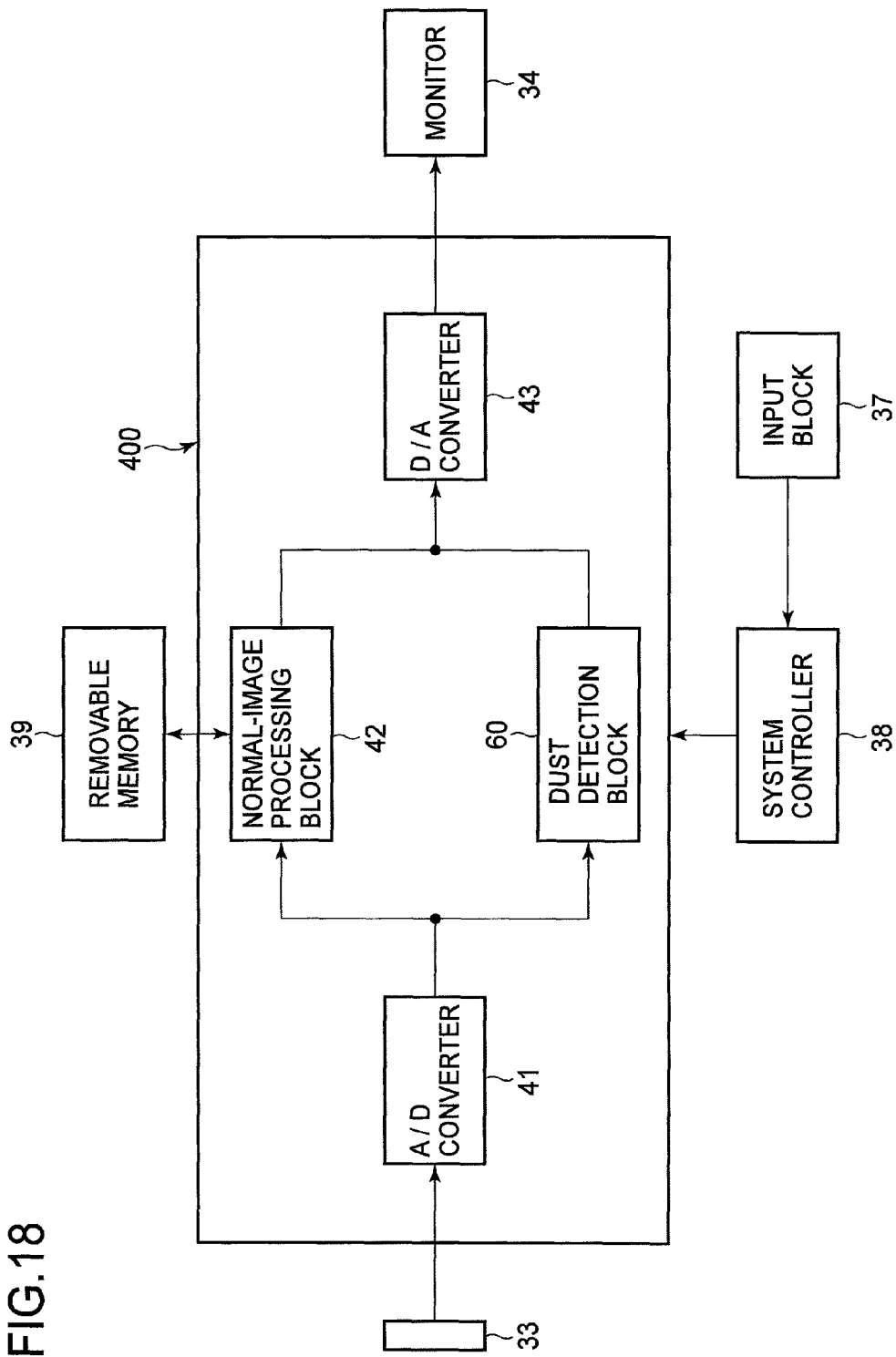
FIG. 18 is a block diagram showing the internal structure of the image-processing block in the first and third embodiments.

As shown in FIG. 18, the image-processing block 400 comprises an A/D converter 41, a normal-image processing block 42, and a D/A converter 43, as in the first embodiment. In addition, the image-processing block 400 comprises a dust detection block 60, unlike in the first embodiment.

The operations carried out by each component in the photographing and displaying modes are the same as those of the first embodiment. The operation mode of the digital camera 10 is changed to the dust-alert mode by the user's command input to the input block 37, and then the release operation and predetermined data processing carried out by the imaging device 33 and the dust detection block 60, respectively, are initiated.

When the operation mode of the digital camera 10 is changed to the dust-alert mode, the parameters of the lens unit 20, such as the size of the aperture of the diaphragm 23, are adjusted. After finishing the adjustment of the parameters of the lens unit 20, the release operation is carried out, and an image signal is generated.

The image signal generated by the imaging device 33 in the dust-alert mode is transmitted to the image-processing block 400 as a normal dust-image signal, as in the first embodiment. The image-processing block 400 transmits the received normal dust-image signal to the dust detection block 60 via the A/D converter 41.

Figure 19:
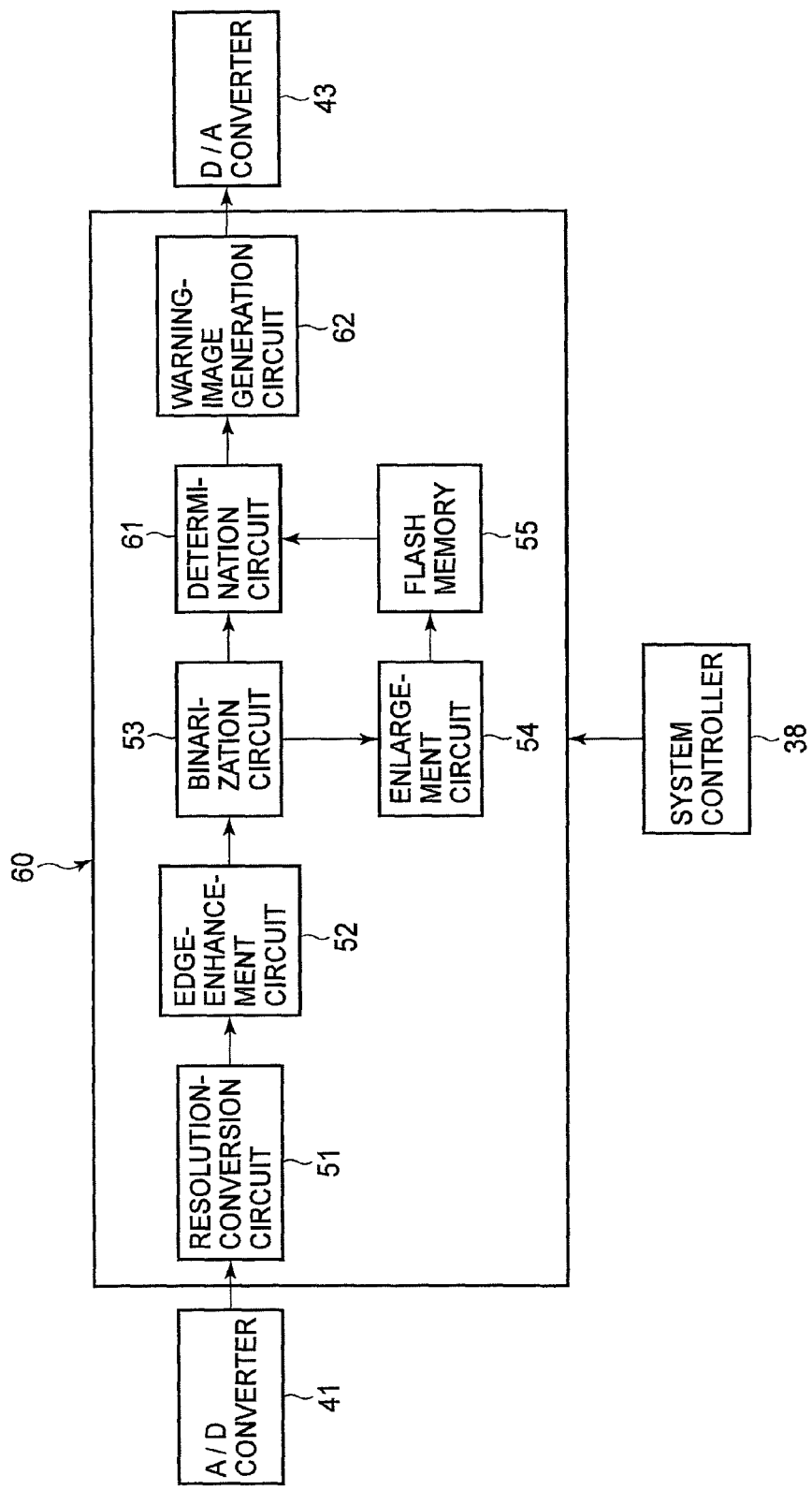
FIG. 19 is a block diagram showing the internal structure of the dust-image processing block in the third embodiment.

As shown in FIG. 19, the dust detection block 60 comprises a resolution-conversion circuit 51, an edge-enhancement circuit 52, a binarization circuit 53, an enlargement circuit 54, a flash memory 55, a determination circuit 61 (second determination block), and a warning-image generation circuit 62.

The same data processing as the first embodiment is carried out on the normal dust-image data by the resolution-conversion circuit 51, the edge-enhancement circuit 52, and the binarization circuit 53. Accordingly, luminance data components of a plurality of pixels that a normal dust image consists of are converted into 0 or 255. The converted luminance data components of pixels are transmitted to the determination circuit 61 in order.

In the flash memory 55, the intrinsic-flaw image data generated according to the same method as the first embodiment is stored. The luminance data component of the same pixel of the intrinsic-flaw image data as that of the received luminance data component of the normal dust-image data is transmitted to the determination circuit 61.

If the value of a received luminance data component of the intrinsic-flaw image data is 255, the pixel is out of the intrinsic-flaw area. Then, the determination circuit 61 determines whether or not dust is detected in the normal dust image based on the value of a luminance data component of the normal dust-image data. If the data level of the luminance data component of the normal dust-image data is 0, the determination circuit 61 determines that dust is present.

On the other hand, if the value of a received luminance data component of the intrinsic-flaw image data is 0, the pixel is in the intrinsic-flaw area. Then, the determination circuit 61 is suspended to determine whether or not dust exists in the normal dust image.

If dust is detected among one frame of the normal dust-image data, an order to generate a warning image is transmitted to the warning-image generation circuit 62. When the warning-image generation circuit 62 receives the order, the warning-image generation circuit 62 generates warning-image data corresponding to the warning image for alerting that dust is attached to the imaging device 33. The warning-image data is transmitted to the monitor 34 via the D/A converter 43, and then the warning image is displayed on the monitor 43.

Figure 20:
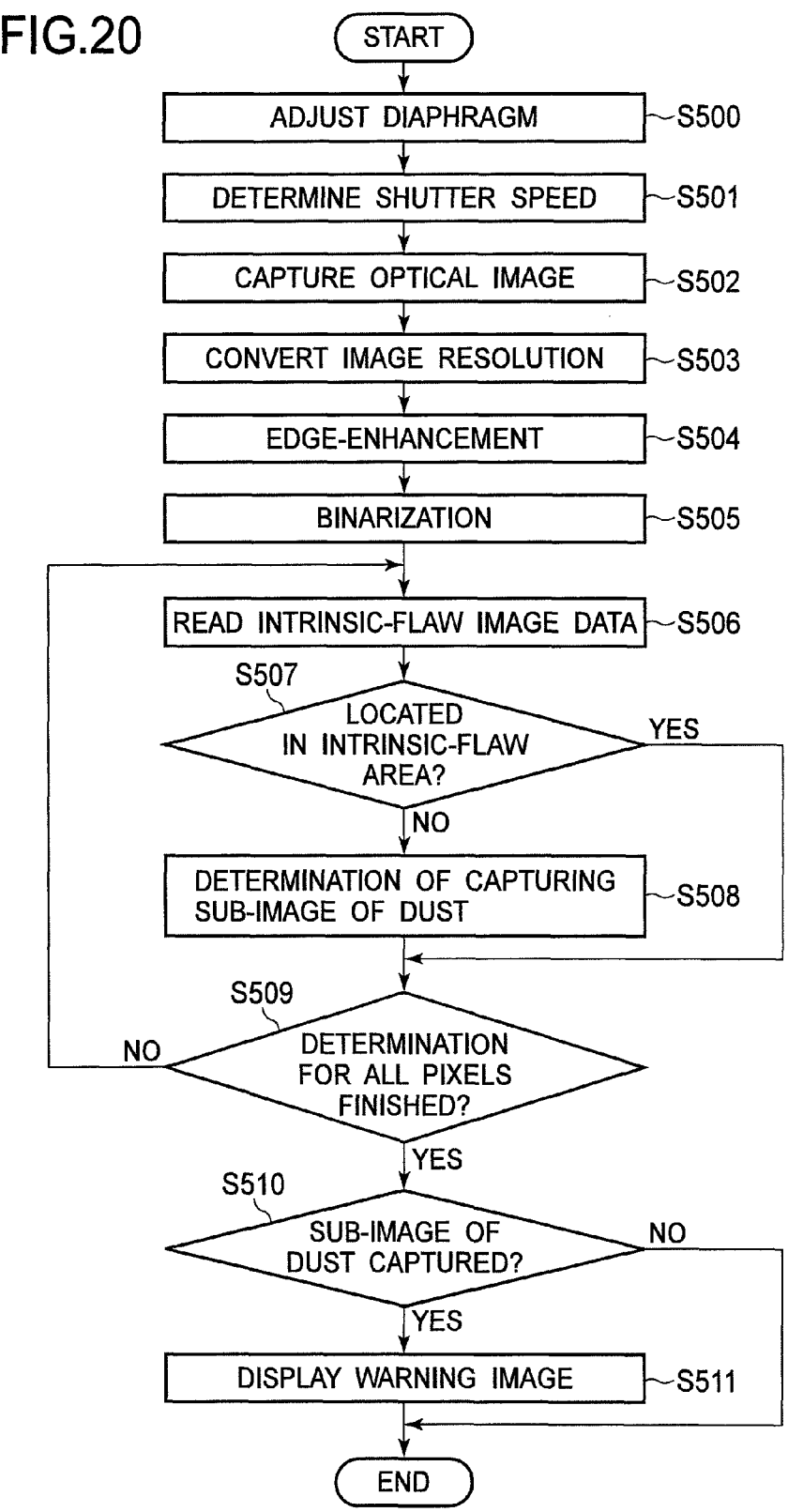
FIG. 20 is a flowchart illustrating the processes carried out by the system controller in the dust-alert mode in the third embodiment.

Next, the processes carried out by the system controller 38 in the dust-alert mode in the third embodiment are explained using the flowchart of FIG. 20. Here as well, the intrinsic-flaw image data is generated according to the same method as the first embodiment shown in FIG. 10, and stored in the flash memory 55 in advance.

The process in the dust-alert mode commences when the user inputs a command to commence the dust-alert mode to the input block 37. Before commencing the dust-alert mode, the digital camera 10 is fixed so that an optical image of a pattern-less subject incident on the imaging device 33 occupies the entire effective imaging area.

At steps S500-S505, the system controller 38 controls each component to carry out the same operations, such as determination of the parameters of the lens-unit 20, capture of an optical image, and predetermined data processing on a generated image data, as at steps S200-S205 in the first embodiment. In addition, the system controller 38 orders the dust detection block to input luminance data components of the normal dust-image data having undergone predetermined data processing in order.

At step S506 following step S505, the system controller 38 orders the determination circuit 61 to read the luminance data components of the intrinsic-flaw image data stored in the flash memory 55 in order. At step S507 following step S506, the system controller 38 orders the determination circuit 61 to determine whether or not a pixel of a received luminance data component is located in the intrinsic-flaw area.

If the pixel is out of the intrinsic-flaw area, the process proceeds to step S508. At step S508, the system controller 38 orders the determination block 61 to determine whether or not a sub-image of dust is captured in the entire normal dust image based on the luminance data component of the normal dust-image data. If the pixel exists in the intrinsic-flaw area or after the determination block 61 finishes the determination, the process proceeds to step S509.

At step S509, the system controller 38 orders the determination circuit 61 to determine whether or not the determination at step S507 for the luminance data components of all pixels of one frame of the normal dust-image data is finished.

If the determination for all the luminance data components is not finished, the process returns to step S505, and steps S506-S509 are repeated until the determination for all the luminance data components is finished. If the determination for all the luminance data components is finished, the process proceeds to step S510.

At step S510, the system controller 38 orders the determination circuit 61 to determine whether or not a sub-image of dust is captured at least in one pixel in determination at step S508. If a sub-image of dust has been captured, the process proceeds to step S511. At step S511, the system controller 38 orders the warning-image generation circuit 62 to generate the warning image data, and orders the monitor 34 to display the warning image. If a sub-image of dust is not captured in any of the pixels or when the warning image is displayed on the monitor 34, the process in the dust-alert mode terminates.

Also in the above third embodiment, dust introduced after the intrinsic-flaw image was captured can be detected.

The aperture values for capturing the normal dust image and the intrinsic-flaw image are predetermined so that the values are different from each other in the above first-third embodiments. However, other parameters of the lens unit 20 between for those for capturing the normal dust image and those for the intrinsic-flaw image are predetermined so as to differ from each other. As long as parameters of the lens unit 20 are changed so that the visibility of sub-images of dust upon capturing the normal dust image is reduced compared to that upon capturing the intrinsic-flaw image, all sub-images of dust in the intrinsic-flaw image can be sufficiently deleted from the normal dust image.

The aperture values for capturing the normal dust image and the intrinsic-flaw image are predetermined so that the aperture value for capturing the normal dust image is less than that upon capturing the intrinsic-flaw image in the above first-third embodiments. However, the aperture values do not have to be changed between those used for capturing the normal dust image and those for the intrinsic-flaw image. Of course, it is preferable to change the aperture values in order to effectively delete sub-images of dust in the intrinsic-flaw image from the normal dust image. However, even if the aperture values are not changed, most of the sub-images in the intrinsic-flaw image can be removed.

Sub-images of dust in the intrinsic-flaw image are deleted from the normal dust image by deleting sub-images of dust located in the intrinsic-flaw area in the entire intrinsic-flaw image in the above first and second embodiments. However, the sub-images of dust in the intrinsic-flaw image may be deleted from the normal dust image according to any other method.

The area where a frame around the entire area of the captured intrinsic-flaw image is located is also determined as the intrinsic-flaw area in the above first and second embodiments. However, the area does not have to be determined as the intrinsic-flaw area. As described above, it is preferable to determine the area of frame as the intrinsic-flaw area in order to effectively delete sub-images of dust in the intrinsic-flaw image from the normal dust image. However, even if the area is not determined as the intrinsic-flaw area, most of the sub-images in the intrinsic-flaw image can be removed.

The enlarged detected-flaw area is determined as the intrinsic-flaw area in the first and third embodiments. However, the detected-flaw area may be determined as the intrinsic-flaw area without enlarging. As long as the parameters of the lens unit 20 upon capturing the intrinsic-flaw image and the normal dust image are equal, sub-images of dust in the intrinsic-flaw image can be deleted from the normal dust image without enlarging the detected-dust image. In addition, even if the parameters of the lens unit 20 are different, some of the sub-images of dust in the intrinsic-flaw image can be deleted from the normal dust image.

The intrinsic-flaw area is enlarged according to the location of the exit pupil in the second embodiment. However, the intrinsic-flaw area may not be enlarged according to the location of the exit pupil. As long as the locations of the exit pupil upon capturing the intrinsic-flaw image and the normal dust image are equal to each other, sub-images of dust in the intrinsic-flaw image can be deleted from the normal dust image without the adjustment. In addition, even if the locations of the exit pupil are different, some of the sub-images of dust in the intrinsic-flaw image can be deleted from the normal dust image.

The width of the frame to be determined as the intrinsic-flaw area is changed according to the location of the exit pupil in the second embodiment. However, the width may not be changed according to the location of the exit pupil. As described above, it is preferable to change the width of frame in order to effectively delete sub-images of dust in the intrinsic-flaw image from the normal dust image. However, even if the width is not changed, most of the sub-images in the intrinsic-flaw image can be removed.

The magnification for enlarging sub-images of dust in the intrinsic-flaw image is determined according to the aperture value in the second embodiment. The magnification can be constant regardless of the aperture value. As long as the aperture values upon capturing the intrinsic-flaw image and the normal dust image are equal, sub-images of dust in the intrinsic-flaw image can be deleted from the normal dust image without changing the magnification. In addition, even if the aperture values are different, some of the sub-images of dust in the intrinsic-flaw image can be deleted from the normal dust image.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2008-012532 (filed on Jan. 23, 2008), which is expressly incorporated herein, by reference, in its entirety.

The invention claimed is:

1. A dust detection system, comprising:
a receiver that receives image data, an imager generating said image data according to a captured optical image;
a dust extraction processor that generates dust-image data by extracting sub-images of dust in said captured optical image on a basis of said image data;
a memory that stores intrinsic-flaw image data corresponding to an intrinsic-flaw image, said intrinsic-flaw image including an intrinsic-flaw area determined based on a detected-flaw area, said detected-flaw area being an area where first sub-images of dust are detected by said dust extraction processor in an initializing operation, said first sub-images of dust being enlarged by an enlargement circuit to generate said intrinsic-flaw area from said detected-flaw area; and an image correction processor that generates corrected dust-image data based on said intrinsic-flaw image data and normal dust-image data, said corrected dust-image data corresponding to a corrected dust image, said normal dust-image data corresponding to a normal dust image including second sub-images of dust that said dust extraction processor extracts after said initializing operation, said corrected dust image being said normal dust image that said first sub-images of dust in said intrinsic-flaw image are deleted from.

2. A dust detection system according to claim 1, wherein a frame area is determined as said intrinsic-flaw area, a frame enclosing said entire intrinsic-flaw image is located on said frame area, and said frame has a first width.

3. A dust detection system according to claim 1, wherein said intrinsic-flaw area is determined so that said first sub-images of dust are enlarged by a predetermined number of pixels out from a center of the first sub-images of dust.

4. A dust detection system according to claim 1, wherein said intrinsic-flaw area is determined by enlarging said detected-flaw area in a direction away from an intersection point of an optical axis of a photographic optical system and said imager,
    said detected-flaw area is enlarged in an inverse proportion to a distance between an exit pupil of said photographic optical system and said imager, and
    said photographic optical system is mounted on a light-receiving surface side of said imager.

5. A dust detection system according to claim 2, wherein said frame area is determined so that a width of said frame area increases in accordance with a distance between an exit pupil and a light-receiving surface of said imager.

6. A dust detection system according to claim 1, wherein said intrinsic-flaw area is determined so that an area of said intrinsic-flaw increases in accordance with a size of an aperture of a diaphragm, said diaphragm being mounted on a light-receiving surface side of said imager.

7. A dust detection system according to claim 1, further comprising:
    a first determination processor that determines a value of an adjustable parameter, said adjustable parameter affecting a visibility of a sub-image of a subject in an entire image captured by said imager, said subject being located in a vicinity of an outer surface of said imager, said adjustable parameter being determined so that said visibility upon capturing said normal dust image is reduced more than when said intrinsic-flaw image is captured.

8. A dust detection system according to claim 7, wherein said adjustable parameter is a size of an aperture of a diaphragm mounted on a light-receiving surface side of said imager, said first determination processor determining said size so that said size upon capturing said normal dust image is larger than upon capturing said intrinsic-flaw image.

9. A digital camera, comprising:
    a receiver that receives image data, an imager generating said image data according to a captured optical image;
    a dust extraction processor that generates dust-image data by extracting sub-images of dust in said captured optical image on a basis of said image data;
    a switch for commanding said dust extraction processor to generate said dust-image data;
    a memory that stores intrinsic-flaw image data corresponding to an intrinsic-flaw image, said intrinsic-flaw image including an intrinsic-flaw area determined based on a detected-flaw area, said detected-flaw area being an area where sub-images of dust are detected by said dust extraction processor in an initializing operation, said sub-images of dust being enlarged by an enlargement circuit to generate said intrinsic-flaw area from said detected-flaw area; and
    an image correction processor that generates corrected dust-image data based on said intrinsic-flaw image data and normal dust-image data, said corrected dust image data corresponding to a corrected dust image and being generated by said dust extraction processor upon an operation of said switch, said corrected dust image being a normal dust image from which said sub-images of dust in said intrinsic-flaw image are deleted, said normal dust image corresponding to said normal dust-image data.

10. A dust detection system according to claim 1, wherein said dust extraction processor calculates an average luminance value of a luminance data component of each pixel of said normal dust-image data of said dust-image, and converts said luminance data component of each pixel of said normal dust-image data to one of a first value and a second value.

11. A dust detection system according to claim 10, wherein said first value is a lowest value on a scale of said luminance data component and said second value is a highest value on said scale of said luminance data component.

12. A dust detection system according to claim 1, wherein said dust extraction processor calculates an average luminance value of a luminance data component of each pixel of said normal dust-image data of said normal dust-image, and converts said luminance data component of each pixel of said normal dust-image data to one of a first value and a second value.

13. A dust detection system according to claim 12, wherein said dust extraction processor converts said luminance data component of each pixel which is within a predetermined range of said average luminance value to said second value, and converts said luminance data component of each pixel which is outside said predetermined range of said average luminance value to said first value.

14. A dust detection system according to claim 1, wherein said second sub-images of dust in said normal dust image that are proximate to said intrinsic-flaw area in said intrinsic-flaw image are deleted from said corrected dust image for further defining said corrected dust image.

15. A dust detection system, comprising:
    a memory that stores intrinsic-flaw image data corresponding to an intrinsic-flaw image captured in an initializing operation, said intrinsic-flaw image including an intrinsic-flaw area, said intrinsic-flaw area determined based on first sub-images of dust detected in said initializing operation, said first sub-images of dust being enlarged by an enlargement circuit to generate said intrinsic-flaw area based on said first sub-images of dust;
    a dust image generator for generating dust-flaw image data corresponding to a dust-flaw image captured in a dust-alert operation, said dust-flaw image including a dust-flaw area, said dust-flaw area determined based on second sub-images of dust detected in said dust-alert operation; and
    an image correction processor that generates corrected-dust-flaw image data based on said intrinsic-flaw image data and said dust-flaw image data, said corrected-dust-flaw image data corresponding to a corrected-dust-flaw image, said corrected-dust-flaw image including said second sub-images of dust of said dust-flaw image from which said first sub-images of dust of said intrinsic-flaw image are deleted.

16. A dust detection system according to claim 15, wherein said image correction processor calculates an average luminance value of a luminance data component of each pixel of said dust-flaw image data of said dust-flaw image, and converts said luminance data component of each pixel of said dust-flaw image data to one of a first value and a second value.

17. A dust detection system according to claim 16, wherein said image correction processor converts said luminance data component of each pixel which is within a predetermined range of said average luminance value to said second value, and converts said luminance data component of each pixel which is outside said predetermined range of said average luminance value to said first value.

18. A dust detection system according to claim 15, wherein said second sub-images of dust in said dust-flaw image that are proximate to said intrinsic-flaw area in said intrinsic-flaw image are deleted from said corrected-dust-flaw image for further defining said corrected-dust-flaw image.

19. A dust detection system according to claim 1, wherein said image correction processor reduces a number of pixels in said normal dust-image data for lowering an image resolution of said normal dust-image data before generating said corrected dust-image data.

20. A dust detection system according to claim 15, wherein said image correction processor reduces a number of pixels in said normal dust-image data for lowering an image resolution of said normal dust-image data before generating said corrected dust-image data.

* * * * *